(12) United States Patent
Arakawa

(10) Patent No.: US 7,641,062 B2
(45) Date of Patent: Jan. 5, 2010

(54) WIRE GRIPPER AND ARTICLE SUSPENSION SYSTEM

(75) Inventor: Hideo Arakawa, Tokyo (JP)

(73) Assignee: A.G.K. Ltd., Tokorozawa-Shi (JP)

( * ) Notice: Subject to any disclaimer, the term of this patent is extended or adjusted under 35 U.S.C. 154(b) by 813 days.

(21) Appl. No.: 11/093,582

(22) Filed: Mar. 30, 2005

(65) Prior Publication Data

US 2008/0023616 A1    Jan. 31, 2008

(30) Foreign Application Priority Data

Jul. 26, 2004  (JP)  ............................. 2004-217090
Feb. 25, 2005  (JP)  ............................. 2005-050159

(51) Int. Cl.
*A47F 7/00* (2006.01)

(52) U.S. Cl. ..................................... 211/117

(58) Field of Classification Search ................ 211/117, 211/119.09, 119.15; 24/136 A, 115 L; 16/221; 292/323, 252, 315, 318, 319; 248/489
See application file for complete search history.

(56) References Cited

U.S. PATENT DOCUMENTS

| | | | | |
|---|---|---|---|---|
| 674,673 | A * | 5/1901 | Dauber | 211/117 |
| 1,829,760 | A * | 11/1931 | Santiago | 294/86.22 |
| 2,514,760 | A * | 7/1950 | Hanson et al. | 294/86.31 |
| 2,524,254 | A * | 10/1950 | Everley | 24/136 A |
| 3,961,711 | A * | 6/1976 | Perks | 211/117 |
| 3,994,521 | A * | 11/1976 | Van Gompel | 292/319 |
| 4,141,117 | A * | 2/1979 | Van Gompel | 24/136 R |
| 4,392,555 | A * | 7/1983 | Ellis | 188/65.1 |
| 4,656,698 | A * | 4/1987 | Arakawa | 24/136 A |
| 4,736,855 | A | 4/1988 | Arakawa | |
| 4,830,340 | A * | 5/1989 | Knitig | 254/391 |
| 5,147,145 | A * | 9/1992 | Facey et al. | 403/314 |
| 5,222,776 | A * | 6/1993 | Georgopoulos et al. | 292/323 |
| 5,337,459 | A * | 8/1994 | Hogan | 24/136 A |
| 5,350,071 | A * | 9/1994 | Pond | 211/70.6 |
| 5,352,003 | A | 10/1994 | Bystry | |
| 5,542,530 | A * | 8/1996 | Freelander | 206/292 |

(Continued)

FOREIGN PATENT DOCUMENTS

EP    0 621 385 A1    10/1994

(Continued)

*Primary Examiner*—Sarah Purol
(74) *Attorney, Agent, or Firm*—Frishauf, Holtz, Goodman & Chick, P.C.

(57) ABSTRACT

A wire gripper having a gripping mechanism capable of gripping two wires at a desirable position thereof for suspending a heavy article without a rotation of the article around an axis of each wire is provided. The wire gripper (1) has an inner sleeve (10) and an outer sleeve (40). The inner sleeve (10) is formed with two wire-insertion bores (11) and two pairs of ball-set bores (21), each bore open at both the wire-insertion bores and an outer surface of the inner sleeve. And, the inner sleeve (10) has a tapered outer surface formed at a portion where the ball-set bores are formed. A spring 60 biases the inner sleeve (10) so that the tapered outer surface of the inner sleeve (10) contacts the tapered inner surface (41*a*) of the outer sleeve (40). Large-diameter balls (31) and small-diameter balls (31) are received in the ball-set bores (21) and protrude partially into the wire-insertion bores (11) so as to press the wire with three balls in the four balls.

6 Claims, 24 Drawing Sheets

U.S. PATENT DOCUMENTS

| | | | | |
|---|---|---|---|---|
| 6,155,617 | A * | 12/2000 | Kuenzel | 292/318 |
| 6,345,847 | B1 * | 2/2002 | Dreisbach et al. | 292/323 |
| 6,360,408 | B1 * | 3/2002 | Dykstra et al. | 24/598.7 |
| 6,415,476 | B1 * | 7/2002 | McCoy | 16/257 |
| 7,073,828 | B2 * | 7/2006 | Foigel et al. | 292/315 |
| 7,172,225 | B2 * | 2/2007 | Foigel et al. | 292/315 |
| 7,278,665 | B2 * | 10/2007 | Rogatnev | 292/307 R |
| 7,478,847 | B2 * | 1/2009 | Kleynerman et al. | 292/323 |
| 2008/0023616 | A1 * | 1/2008 | Arakawa | 248/489 |

FOREIGN PATENT DOCUMENTS

WO    WO 94/11265 A    5/1994

* cited by examiner

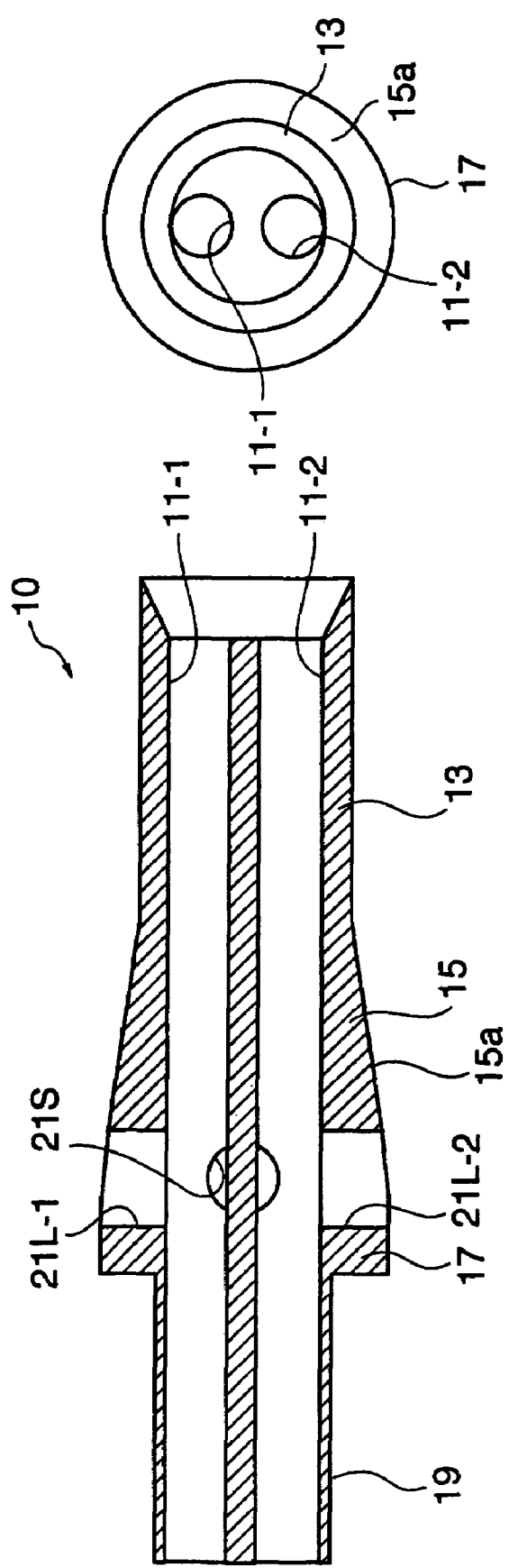

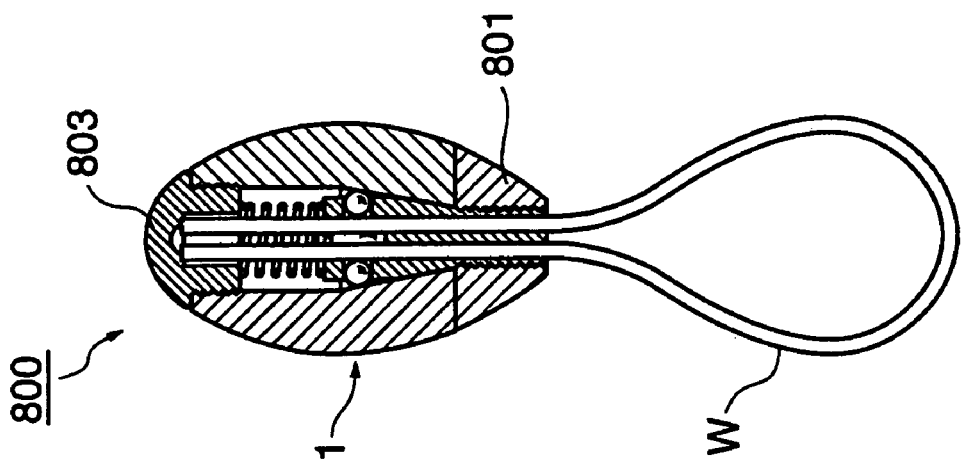
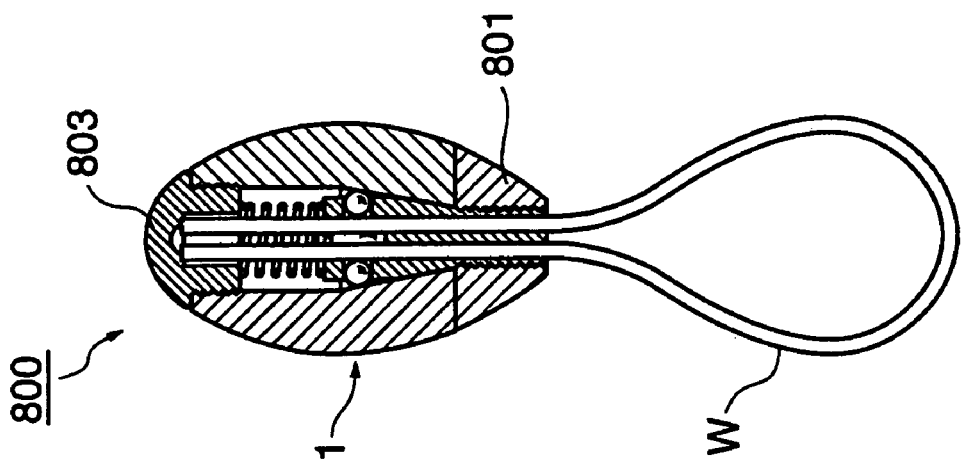
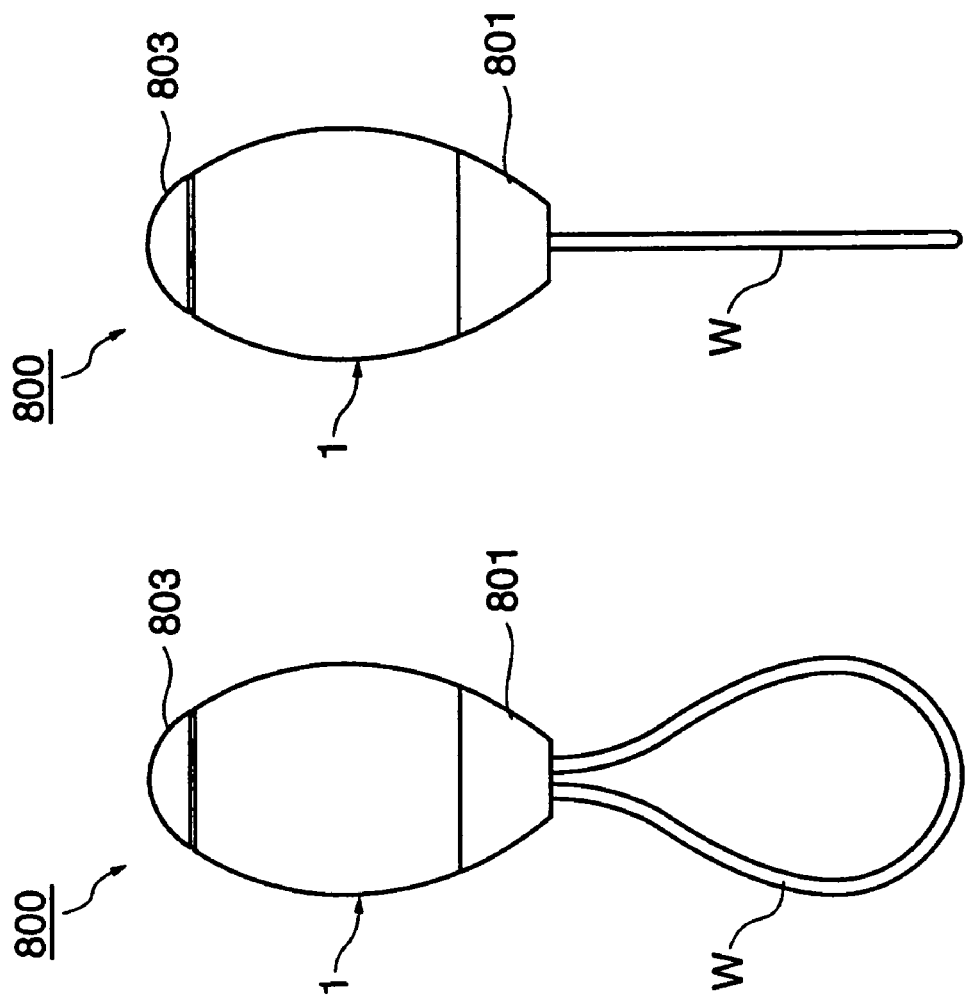

US 7,641,062 B2

WIRE GRIPPER AND ARTICLE SUSPENSION SYSTEM

FIELD OF THE INVENTION

The present invention relates to a wire gripper capable of suspending an article at a desirable position of two wires. More particularly, the present invention relates to a wire gripper used for suspending a relatively heavy article without a rotation of the article around an axis of the wire, providing a neat appearance.

BACKGROUND OF THE INVENTION

In a shop window of a clothing shop and the like, a mannequin with a dress is sometimes displayed hung from a ceiling by a wire. Since such a mannequin is relatively heavy, suspending the mannequin requires a stranded wire having a larger diameter (1.5 to 2.5 mm) than that of a wire used for suspending a relatively light-weight article such as a clothes hanger.

When one stranded wire suspends a relatively heavy article, the wire is twisted easily and therefore the suspended article rotates around the wire, resulting in a problem that the article cannot be displayed facing the front. This is mainly caused by the stranded wire. When a heavy article is suspended using one stranded wire, the stranded wire is twisted by its tension in the direction in which the stranded wire is loosened. Here, an angle of the twist is nearly proportional to the tension applied to the wire (i.e., the weight of the article to be suspended). Consequentially, in order to suspend an article using a stranded wire without a rotation of the article around an axis of the wire, generally, a weight for weight adjusting is hung from a lower end of the wire, or the article is suspended using two wires.

FIG. 11 show states in which mannequins are suspended by conventional methods.

FIG. 11A shows a state in which a weight D is hung from a lower end of a wire W to which a mannequin F is suspended. For example, the weight D has weight of 3 kg. By hanging the weight D, the stranded wire W is pulled downward and therefore stretched tight, whereby a torsion of the stranded wire W can be kept at a substantially constant state.

FIG. 11B shows a state in which a mannequin P is suspended from a ceiling using two wires W. Two wire grippers 100 are mounted on a neck portion of the mannequin F. To each of the wire grippers 100, each lower end of the two wires W is connected. Each upper end of the wires W is connected to a wire attachment 101. The wire attachments 101 are coupled to parallel rails 103 which are mounted to the ceiling.

Using two wires W, the upper ends (the attachments 101) and the lower ends (the grippers 100) of the two wires W shape a plane surface. By shaping the plane surface, twisting of each stranded wire W is limited so that an article can be suspended without a rotation of the article around the wire.

However, in the conventional method using a weight shown in FIG. 11A, the weight D hung down under the mannequin P does not make a good showing. In addition, a load applied to the wire W, a wire attachment to which the wire is connected and the rail 103 to which the wire attachment is coupled becomes larger by just the weight of the weight D.

And, the conventional method using two wires shown in FIG. 11B also does not make a good showing. In addition, the method needs two wire grippers 100, resulting in giving a clutter showing. Furthermore, in order to change a height of the suspending article, two wire grippers capable of gripping a wire at a desirable position are required. In this case, it is necessary that after one of the wire gripper is slid along the wire and held to a desirable position thereof, the other wire gripper is also slid along the wire and held to the same position, which is quite inconvenient.

SUMMARY OF THE INVENTION

In order to solve the above problems, an object of the present invention is to provide a wire gripper having a gripping mechanism capable of gripping two wires at a desirable position thereof for suspending a heavy article without a rotation of the article around an axis of each wire.

A wire gripper according to the present invention comprises: an inner sleeve having the following components (A), (B) and (C); (A) two wire-insertion bores for inserting each of two wires, (B) two pairs of ball-set bores, each bore opened at both the wire-insertion bores and an outer surface of the inner sleeve, and (C) a tapered outer surface formed at a portion where the ball-set bores are formed; four balls received in the ball-set bores and protruding partially into the wire-insertion bores so as to press the wire, in which one group composed of three balls in the four balls presses one wire and the other group composed of three balls in the four balls presses the other wire; an outer sleeve having a tapered inner surface which contacts the tapered outer surface of the inner sleeve so as to press the balls inward; and a spring for biasing the inner sleeve relative to the outer sleeve in a direction in which the tapered outer surface is tapered down.

Since a single wire gripper can grip two wires, it is not necessary to use two grippers for suspending an article as before. This makes a good appearance and facilitates the operations for mounting the gripper and changing the height of the suspending article. As described above, when an article is suspended using one stranded wire, an angle of twist of the stranded wire considerably changes in proportion to the weight of the article, resulting in problem in which the article cannot face to a desirable direction. However, using the wire gripper of this invention solves such problems. And, by mounting a wire gripper to each suspending position, a panel can be suspended without swinging in forward and backward directions.

In the present invention, the four balls are preferably composed of one pair of two balls facing each other having a relatively large-diameter and the other pair of two balls facing each other having a relatively small-diameter, and a diameter ratio of the large-diameter ball to the small-diameter ball is about 3:2.

According to the present invention, each of two wires can be held at an approximately center of the wire-insertion bore with stable forces.

And, in the wire gripper, a size of a wire to be gripped and an outer diameter of an outer sleeve are equal to those of a conventional wire gripper which gripes one wire, whereby the outer sleeve can be used for both the wire gripper according to the present invention and a conventional wire gripper.

In the present invention, the inner sleeve preferably has a tip portion protruded from the outer sleeve in a direction in which the inner surface of the outer sleeve is tapered down, and the wire gripper further comprises; a wire guide cap mounted to the protruded tip portion of the inner sleeve, in which the wire guide cap having a wire-insertion bore formed with a tapered inner surface which is widened towards the tip end thereof.

In the present invention, the wire guide cap preferably serves as a mechanism for locking the wire to the wire gripper.

By mounting the wire guide cap to the tip portion of the inner sleeve, the wire can be locked in grip position, whereby it is prevented that the inner sleeve is carelessly pressed relative to the outer sleeve. And, when the upper or lower ends of the wires gripped to the wire gripper are each connected to one of the two separate attachments, the two wires extend from the wire gripper in leftward and rightward directions. In this case, the wires preferably should extend from the inner sleeve along desirable curvatures in order to facilitate various operations, such as releasing of the wires and view of the wires in both directions. In order to realize such condition, the wire guide cap, which has the tapered inner surface widened towards the tip end thereof, is mounted to the tip of the inner sleeve so that the extended wires can be guided smoothly in the extending directions along the tapered inner surface. And, the wires are bent smoothly so as to be prevented from being kept curved.

An article suspension system for suspending an article by wires according to the present invention comprises: a wire gripper according to any one of claims 1 to 3 connected the article, and two wires which are gripped to the wire gripper.

According to the present invention, a heavy article such as a mannequin and an article of weight variety can be suspended facing a desirable direction. And, a panel or a shelf can be suspended without swinging in backward and forward directions.

An exhibit article suspension system for suspending an exhibit article for display by wires according to the present invention comprises: a wire gripper according to any one of claims 1 to 3, in which the wire gripper is mounted to a part (a suspending portion) of the exhibit article, two wires which are gripped to the wire gripper at the lower ends thereof and extend upward from the wire gripper, and an attachment for connecting an upper end of each of the wires to a fixture such as a ceiling.

In the present invention, the exhibit article is preferably formed with two separate suspending portions and the wire gripper is mounted to each of the suspending portions.

According to the present invention, swinging and rotating of the exhibit article can be decreased further.

A wire hanger according to the present invention comprises: a wire gripper according to any one of claims 1 to 3, and a wire, one end thereof extending from one wire-insertion bore and inserting into the other wire-insertion bore of the wire gripper so as to form into a loop.

According to the present invention, it becomes easy to change a length of the loop. Here, the "hanger" is used for placing an article using wires while giving tension to the article in addition to suspending an article using wires.

In the present invention, the outer sleeve is preferably formed with a shelf catch portion having a groove to which a shelf is inserted.

According to the present invention, when the wire gripper is used for a system for suspending a shelf, the shelf will be easily suspended.

A shelf suspension system for suspending a shelf horizontally by wires according to the present invention comprises: a wire gripper according to claim 9 connected to a side edge of said shelf, and two wires gripped to the wire gripper.

Another shelf suspension system for suspending a shelf horizontally by wires according to the present invention comprises: a wire gripper according to any one of claims 1 to 3 which is mounted to a fixture such as a ceiling, another wire gripper according to claim 9 which is mounted to each of separate positions (suspending positions) along a side edge of the shelf, still another wire gripper according to any one of claims 1 to 3 which is mounted to a fixture or a weight, and two wires gripped to each of the wire grippers.

In the present invention, when a wire gripper has a hook formed on the outer sleeve, a hanger is easily suspended to the wire gripper.

An article placing system for placing an exhibit article, an interior equipment or an exterior equipment (an article to be placed)) according to the present invention comprises: a wire gripper according to any one of claims 1 to 3 which is mounted to a fixture such as a ceiling, and a wire of which the both ends are inserted into the wire-insertion bores of the wire gripper so as to make a loop for connecting the article to be placed.

According to the present invention, since a length of the loop can be changed easily, a height of the suspending article and a tension applied to the article can be easily adjusted. Using a wire gripper for gripping one wire can also adjust a length of a wire, however, it is necessary to use two wire grippers or wire attachments in order to connect each end of the wire to a fixture or an article to be suspended. That is, two wire grippers or wire attachments are necessary. On the contrary, when a wire gripper capable of gripping two wires is used and the article to be suspended is formed with a wire-connecting portion, such as an opening through which a wire is passed, one wire gripper is necessary for suspending the article. In addition, a design diversity of the article to be suspended can be extended and the article can be displayed in various ways.

In the present invention, a tension adjusting member, such as a spring and an elastic body, is preferably disposed between the wire gripper and the fixture or between the wire and the article to be placed.

According to the present invention, the spring makes it easy to adjust tension applied to the article to be placed. And, if slack or weak will occur in the article, remarkable decreasing of the tension applied to the article can be prevented.

A canvas spreading system according to the present invention spreads a canvas, wherein opposite sides or opposite corners of the canvas are pulled in the opposite directions by wire grippers according to any one of claims 1 to 3 to which a tension adjusting member is connected in series.

Another canvas spreading system according to the present invention spreads a canvas, wherein opposite sides or opposite corners of the canvas are pulled to the opposite directions by the wire hangers according to claim 8.

In the present invention, when an elastic and flexible cord is mounted along each edge of the canvas, the canvas can be placed while giving tension to each edge thereof.

A partition system according to the present invention divides a plane by crossing strands in the plane, wherein ends of one or two strands are gripped and pulled in the opposite directions by the wire grippers according to any one of claims 1 to 3 to which a tension adjusting member is connected in series.

An article suspending system for suspending an article by wires according to the present invention comprises: a wire attachment to which a lower end of a wire is fixedly connected, in which the wire attachment being mounted at each of separate positions of the article, and a wire gripper according to any one of claims 1 to 3 for gripping upper ends of the two wires, in which the wire gripper is mounted to a fixture such as ceiling, wherein the two wires extend downward from the wire gripper in backward and forward directions (in rightward and leftward directions).

A shelf suspending system for suspending a shelf by wires along a wall surface horizontally according to the present invention comprises: a wire gripper according to any one of claims 1 to 3, in which the wire gripper is mounted on each of longitudinally spaced positions of a wall surface, two wires, in which each of upper and lower ends thereof is gripped to the wire gripper, and another wire gripper for gripping an intermediate portion of one wire of the two wires, in which the wire gripper is mounted at each of separate positions along a side edge of the shelf, wherein the two wires extend from the wire grippers, mounted on the wall surface, in backward and forward directions.

Another shelf suspending system for suspending a shelf by wires horizontally according to the present invention comprises: a wire gripper according to any one of claims 1 to 3, in which the wire gripper is mounted on a fixture such as a ceiling, another wire gripper according to any one of claims 1 to 3, in which the wire gripper is mounted at a wire attachment or a weight, two wires, in which each of upper and lower ends thereof are gripped to the wire gripper, and still another wire gripper according to any one of claims 1 to 3 for gripping intermediate portions of the two wires, in which the wire gripper is mounted at each of separate positions along a side edge of the shelf, wherein the two wires extend from each of the wire grippers in backward and forward directions.

Another shelf suspending system for suspending a shelf by wires horizontally according to the present invention comprises: a wire attachment to which upper ends of two wires are fixedly connected, in which the wire attachment is mounted on a fixture such as a ceiling, a wire gripper according to any one of claims 1 to 3 for gripping lower ends of the two wires, in which the wire gripper is mounted at a wire attachment or a weight, and another wire gripper for gripping an intermediate portion of one wire of the two wire, in which the wire gripper is mounted at each of separate positions along a side edge of the shelf, wherein the two wires extend from the wire gripper, mounted at the wire attachment or the weight, in backward and forward directions.

Another shelf suspending system for suspending a shelf by wires horizontally according to the present invention comprises: a wire attachment to which upper ends of two wires are fixedly connected, in which the wire attachment is mounted on a fixture such as a ceiling, a wire gripper according to claim 9 for gripping intermediate portions of the two wires, in which the wire gripper is mounted at each of separate positions along a side edge of the shelf, another wire gripper according to any one of claims 1 to 3 for gripping lower ends of the two wires, in which the wire gripper is mounted at a wire attachment or a weight, and wherein the two wires extend from the wire grippers in backward and forward directions.

A bar suspending system for suspending a bar horizontally according to the present invention comprises: a wire attachment to which an upper end of a wire is fixedly connected, in which the wire attachment is mounted on each of separate positions of a fixture such as a ceiling, a wire gripper according to any one of claims 1 to 3 for gripping intermediate portions of the two wires, in which the wire gripper is mounted at the bar, and another wire gripper according to any one of claims 1 to 3 for gripping lower ends of the two wires, in which the wire gripper is mounted at a wire attachment or a weight, wherein the two wires extend upward from the wire gripper, mounted at the bar, in backward and forward directions and also downward in parallel.

A key ring according to the present invention comprises; a wire gripper according to claim 1 or 2, a wire guide cap mounted at the wire gripper and having a wire-insertion bore, and a wire, in which both ends thereof are gripped to the wire gripper so as to form into a loop.

According to the present invention, a wire gripper capable of gripping two wires at a desirable position thereof can be provided. And, a suspension system for suspending a heavy article without a rotation of the article around an axis of the wire and suspending an article without swinging in backward and forward directions or in leftward and rightward directions using the wire gripper can be provided.

BRIEF DESCRIPTION OF THE DRAWINGS

FIG. 1 show a structure of a wire gripper according to one embodiment of the present invention.

FIG. 2 show a structure of an inner sleeve of the wire gripper of FIG. 1: FIG. 2A is a plane view thereof; and FIG. 2B is a front view thereof.

FIG. 3 show a gripping operation of the wire gripper of FIG. 1.

FIG. 8 show a structure of a wire gripper according to another embodiment of the present invention.

FIG. 10 show a structure of a wire gripper according to another embodiment of the present invention.

FIG. 12 show a structure of a wire gripper according to another embodiment of the present invention.

FIG. 23 show a key ring type wire gripper according to the present invention.

FIG. 24 show a key ring type wire gripper according to the present invention: FIG. 24A is a front view thereof; FIG. 24B is a side view thereof; and FIG. 24C is a front cross sectional views thereof.

DETAILED DESCRIPTION OF EMBODIMENT OF THE INVENTION

The preferred embodiments of the present invention will be described in detail with reference to the accompanying drawings.

Figure 1A:
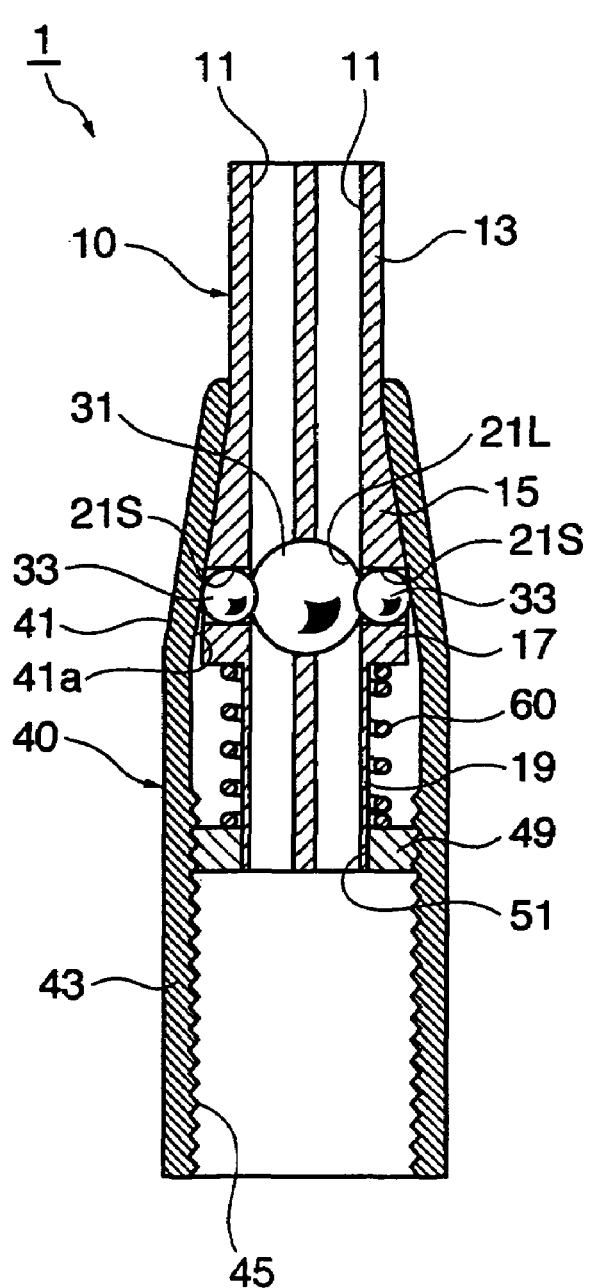
FIG. 1A is a longitudinal section view thereof.
Figure 1B:
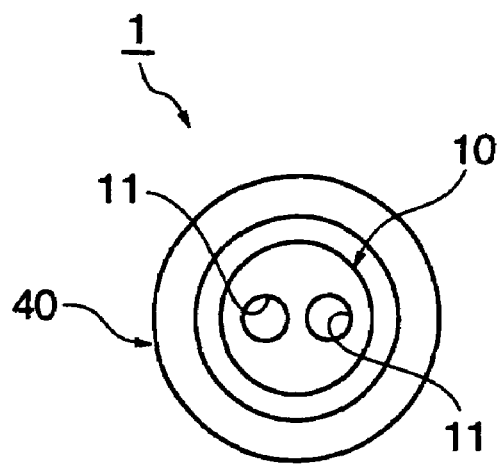
FIG. 1B is a plane view thereof.

FIG. 1 show a structure of a wire gripper according to one embodiment of the present invention: FIG. 1A is a longitudinal section view thereof; and FIG. 1B is a plane view thereof.

FIG. 2 show a structure of an inner sleeve of the wire gripper of FIG. 1: FIG. 2A is a plane view thereof; and FIG. 2B is a front view thereof.

Figure 3A:
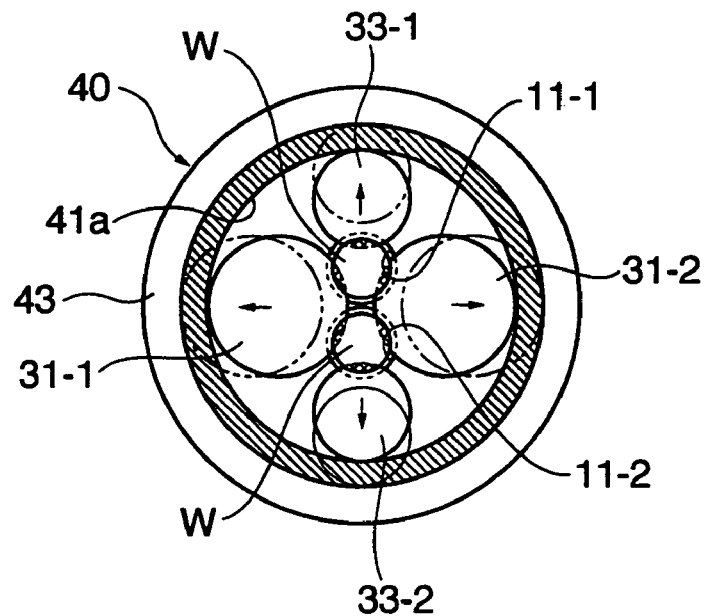
FIG. 3A is a partially cross sectional view thereof.
Figure 3B:
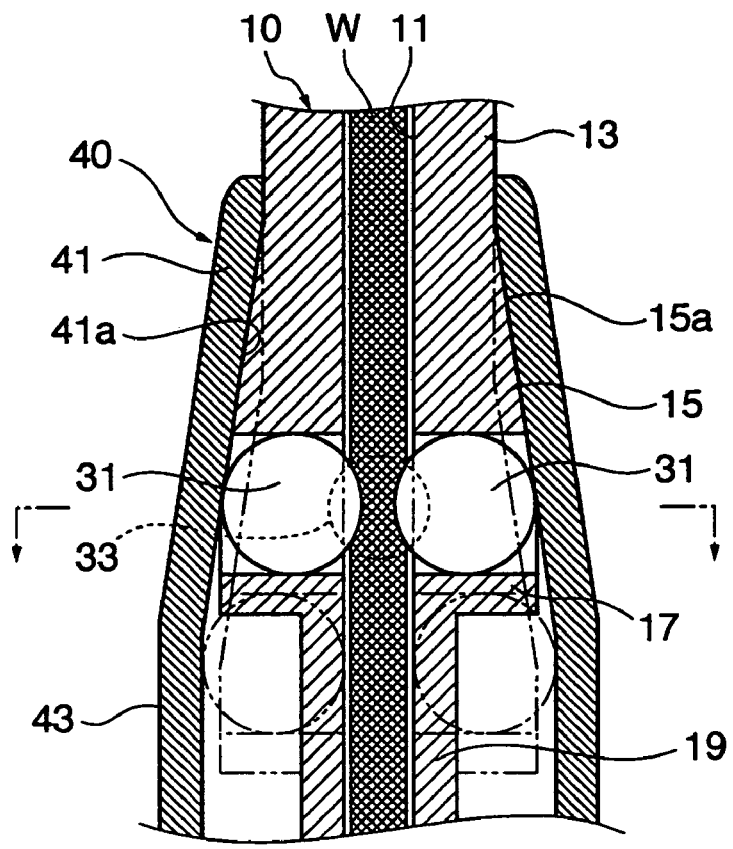
FIG. 3B is a partially longitudinal section view thereof.

FIG. 3 show a gripping operation of the wire gripper of FIG. 1: FIG. 3A is a partially cross sectional view thereof; and FIG. 3B is a partially longitudinal section view thereof.

The wire gripper 1 is provided with an inner sleeve 10, four balls 31 and 33 (as shown in FIG. 3A) received in the inner sleeve 10, an outer sleeve 40 having a hollow bore in which the inner sleeve 10 is received, and a spring 60 which biases the inner sleeve 10 relative to the outer sleeve 40.

Referring to FIG. 2 mainly, a structure of the inner sleeve 10 will be explained. The inner sleeve 10 is sometimes called by a pin.

The inner sleeve 10 is formed with two wire-insertion bores 11 each for inserting a wire (a diameter of 1.2 to 1.5 mm). The wire-insertion bores 11 penetrate the inner sleeve 10 in parallel to an axis (a longitudinal axis) of the inner sleeve 10. Both wire-insertion bores 11 have a same inner diameter constant in the length direction (the longitudinal direction in figure). In this embodiment, the wire-insertion bore 11 has a diameter of 1.8 mm, and a distance between the wire-insertion bores 11 is about 2.5 mm (a distance from the axis of the inner sleeve to each of the wire-insertion bores is 1.25 mm).

The inner sleeve 10 has, in the order from the top, a cylindrical upper portion 13, a conical portion 15, a cylindrical central portion 17 and a cylindrical lower portion 19. The conical portion 15 has a tapered outer surface 15a which is tapered down toward the upper from the lower. The cylindrical central portion 17 is continuously connected to a lower end of the conical portion 15. And, the cylindrical lower portion 19 has an outer diameter smaller than that of the cylindrical central portion 17.

The inner sleeve 10 is formed with ball-set bores 21 between the conical portion 15 and the cylindrical central portion 17, in which the ball-set bores 21 are open at both the outer surface of the inner sleeve 10 and the wire-insertion bores 11. Each of the ball-set bores 21 penetrate in a direction perpendicular to the axis of the wire-insertion bores 11 (in a diametric direction) on a same level in the axis direction of the inner sleeve 10. The ball-set bores 21 are composed of a pair of two large-diameter bores 21L and a pair of two small-diameter bores 21S, in which the bores of each pair face each other relative to the axis of the inner sleeve 10. And, the small-diameter ball-set bores 21S are open at the wire-insertion bores 11 from a diametrical direction in which the wire-insertion bores 11 are aligned. That is, as shown in FIG. 2, one small-diameter ball-set bore 21S-1 is open at one wire-insertion bores 11-1 and the other small-diameter ball-set bore 21S-2 is open at the other wire-insertion bore 11-2. On the contrary, each of the large-diameter ball-set bores 21L-1 and 21L-2 is open at both the wire-insertion bores 11 from a diametrical direction perpendicular to the direction in which the wire-insertion bores 11 are aligned.

In other words, one wire-insertion bore 11-1 is open at one small-diameter ball-set bores 21S-1 and both large-diameter ball-set bores 21L-1 and 21L-2, and another wire-insertion bore 11-2 is open at the other small-diameter ball-set bore 21S-2 and both large-diameter ball-set bores 21L-1 and 21L-2.

In this actual example, the pair of small-diameter ball-set bores 21S and the pair of large-diameter ball-set bores 21L penetrate the inner sleeve 10 in a direction perpendicular to the axis of the inner sleeve 10 with being intersected at right angles each other. So, there is no wall separating the wire-insertion bores 11 at a portion where the pair of small-diameter ball-set bores 21S and the pair of the large-diameter ball-set bores 21L penetrate the inner sleeve 10 and therefore the wire-insertion bores 11 are communicated each other to form a hollow space.

As shown in FIG. 3A, each of the large-diameter ball-set bores 21L receives a large-diameter ball 31, and each of the small-diameter ball-set bores 21S receives a small-diameter ball 33. Each bore has a diameter which is added $\alpha$ (for example, 0.1 mm) to a diameter of the ball received therein, whereby each of the balls 31 and 33 is rotatably and movably received in each ball-set bore 21 in an axis direction of the ball-set bore. Each of the ball-set bores 21 has a length slightly shorter than the diameter of each of the balls 31 and 33. The diameter of each of the balls 31 and 33 is described later.

The outer sleeve 40, having a substantially cylindrically shape, is formed with a hollow bore penetrating on an axis (a longitudinal axis) thereof. In the hollow bore, an upper portion 41 thereof is formed with a tapered inner surface 41a tapered down toward the upper end thereof, and a lower portion 43 thereof is formed with an inner surface having a uniform inner diameter in the axis of the outer sleeve 40. In this embodiment, the inner diameter of the lower portion 43 is 9.2 mm. The lower portion 43 is formed with a thread 45 at an almost lower half of the inner surface. A spring retainer 49 is inserted through an opening of the lower portion 43 and engaged with the thread 45. The spring retainer 49 is formed with a bore 51 at the center thereof, through which the lower portion 19 of the inner sleeve 10 is passed.

The spring 60 is fitted onto the lower portion 19 of the inner sleeve 10 and placed between an under surface of the center portion 17 of the inner sleeve 10 and the spring retainer 49. The spring 60 biases the inner sleeve 10 relative to the outer sleeve 40 (the spring retainer 49) upward so that the tapered outer surface 15a of the inner sleeve 10 contacts the tapered inner surface 41a of the outer sleeve 40. At the same time, the balls received in each of the ball-set bores 21 formed at the inner sleeve 10 contact the tapered inner surface 41a of the outer sleeve 40 at the outside surface thereof.

When the inner sleeve 10 is pressed downward (toward the spring retainer 49) against the biasing force of the spring 60, the inner sleeve 10 is received into the outer sleeve 40.

When the inner sleeve 10 is received into the outer sleeve 40, the upper portion 13 of the inner sleeve 10 is protruded from the upper opening of the outer sleeve 40. And, the tapered outer surface 15a of the conical portion 15 of the inner sleeve 10 contacts the tapered inner surface 41a of the upper portion 41 of the outer sleeve 40. The lower portion 19 of the outer sleeve 10 is passed though the bore 51 of the spring retainer 49.

Referring to FIG. 3, a gripping operation of the wire gripper 1 will be explained.

In FIG. 3, a state in which the tapered outer surface 15a of the inner sleeve 10 contacts the tapered inner surface 41a of the outer sleeve 40 is represented by a solid line, and another state in which the tapered outer surface 15a of the inner sleeve 10 keeps apart from the tapered inner surface 41a of the outer sleeve 40 is represented by a chained double-dashed line.

When the spring 60 biases the inner sleeve 10 upward relative to the spring retainer 49 and therefore the tapered inner surface 15a of the inner sleeve 10 contacts the tapered outer surface 41a of the outer sleeve 40, as represented by a chained double-dashed line in FIG. 3, the balls 31 and 33 received into each ball-set bore 21 are pressed by the tapered inner surface 41a of the outer sleeve 40 and protrude into the wire-insertion bores 11 at the inside surface thereof.

When the wire W will be inserted into the wire gripper 1, the inner sleeve 10 is pressed toward the spring retainer 49 against the biasing force of the spring 60. The inner sleeve 10 moves in a direction in which the inner diameter of the tapered inner surface 41a of the outer sleeve 40 is widened, resulting in producing a clearance between the outer surface of the center portion 17 of the inner sleeve 10 and the tapered inner surface 41a of the outer sleeve 40. Therefore, each of the balls 31 and 33 received into each ball-set bore 21, formed at the center portion 17, can move toward the clearance outward, as shown in arrows of FIG. 3A.

At such the state, the wires W are inserted into the wire-insertion bores 11. When the lead ends of the wires W are reached to the ball-set bores 21 in the wire-insertion bores 11, the balls 31 and 33, movable outward, are pressed outward by outside surfaces of the wires W. This results in opening the wire-insertion bores 11 and therefore allowing inserting the wires W through the wire-insertion bores 11.

After sliding the wire gripper 1 along the wire W for a desirable length, a force in which the inner sleeve 10 is pressed toward the spring retainer 49 is released. And, the inner sleeve 10 is biased by the spring 60 so as to be moved in a direction in which the tapered inner surface 41a of the outer sleeve 40 is tapered down (upward in FIG. 3B). As a result, the balls 31 and 33 are pressed by the tapered inner surface 41a inward and protrude into the wire-insertion bores. Then, each of the wires W is pressed with the two large-diameter balls 31L and one small-diameter ball 31S so as to be gripped.

Next, a diameter of each ball, a positional relation between each ball and the wire-insertion bores and a gripping force using the balls will be explained.

Figure 4:
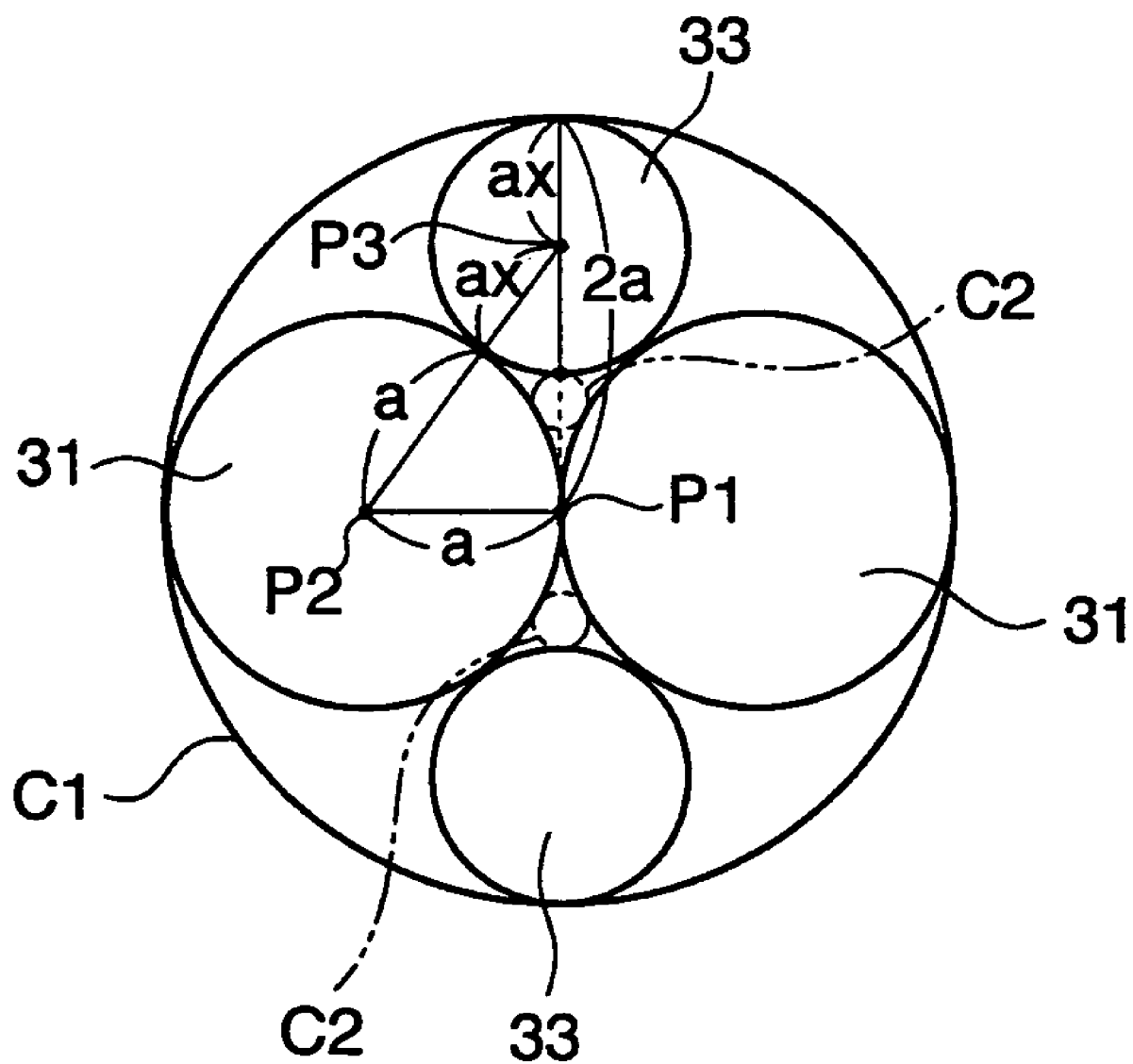
FIG. 4 shows a method for geometrically obtaining the diameter of the ball.

Referring to FIG. 4, a diameter of each ball will be explained.

FIG. 4 shows a method for geometrically obtaining the diameter of the ball.

FIG. 4 shows a state in which the large-diameter balls 31 contact each other and also each of the small-diameter balls 33 contacts both large-diameter balls 31 while each of the balls 31 and 33 being inscribed in a circle C1. In such a case, a line passing a center of each large-diameter ball 31 is perpendicular to a line passing a center of each small-diameter ball 33. Therefore, in a triangle connecting a contact point P1 between the large-diameter balls 31, a center point P2 of the large-diameter ball 31 and a center point P3 of the small-diameter ball 33, when the diameter of the large-diameter ball 31 is set to "a" and the diameter of the small-diameter ball 33 is set to "ax", x=⅔. This shows that a diameter ratio of the large-diameter ball 31 to the small-diameter ball 33 is 3:2. And, the diameter "a" of the large-diameter ball 33 is ½ of a radius of the circle C1.

Note that FIG. 4 shows not a state in which the wires W are actually gripped but a state in which each ball is moved innermost.

In this embodiment, when a diameter of the circle C1 is set to 8 mm, each diameter of the balls 31 and 33 can be obtained in the same manner described above. The obtained diameter of the large-diameter ball 31 is about 4 mm and the obtained diameter of the small-diameter ball 33 is about 2.6 mm. The practically used large-diameter ball 31 has a diameter of 4 mm and the practically used small-diameter ball 33 has a diameter of 2.5 mm. The reason that the diameter of the small-diameter ball 33 practically used is smaller than the geometrically obtained diameter by about 0.1 mm is that the ball having a diameter of 2.5 mm is easily-obtainable in the market.

Next, a state in which a wire is gripped by the balls each having the obtained diameter will be explained.

As described above, the wire W is pressed by two large-diameter balls 31 and one small-diameter ball 33 so as to be gripped. In such a case, the wire W is preferably pressed with substantially equal forces from substantial equally dispersed directions around the axis of the wire W at the center of the wire-insertion bore 11. For this purpose, it is preferable to position the center of each the wire-insertion bore 11 at a center of a circle C2 circumscribed by three balls (one large-diameter ball 31 and two small-diameter balls 33) in FIG. 4. The diameter of the wire-insertion bore 11 is the diameter (1.2 to 1.5 mm) of the wire W to add α.

As shown by a solid line of FIG. 3B, when the tapered inner surface 15a of the inner sleeve 10 contacts the tapered outer surface 41a of the outer sleeve 40, the wire W is gripped by the protruded portions of the balls 31 and 33 which are pressed by the tapered inner surface 41a. In which case, the wire is elastically deformed at portions pressed by the balls 31 and 33. Each of such deformed portions (represented by a hatching in FIG. 3A, an area in which each ball is protruded into the wire-insertion bore, an exposed thread) is set such that the strands of the wire W do not loosen and cut off.

By setting each diameter of the balls 31 and 33 and the position of the wire-insertion bores 11 in the manner described above, it becomes possible that the balls are protruded into the wire-insertion bore 11 from substantial equally dispersed directions around the axis of the wire-insertion bore 11 with substantial same amounts when each ball moves inward in each ball-set bore (in a direction in which the wire W is gripped).

This fact will be explained referring to FIG. 3 more in detail. Since one wire-insertion bore 11 is communicated with two large-diameter bores 21L and one small-diameter bore 21S as described above, one wire W is pressed by two large-diameter balls 31 and one small-diameter ball 33. For example, in FIG. 3A, the wire W, inserted through one wire-insertion bore 11-1, is pressed by two large-diameter balls 31-1 and 31-2 and one small-diameter ball 33-1. In plane, as shown in FIG. 3A, three balls 31-1, 31-2 and 33-1 protrude into the wire-insertion bore 11-1 at substantial equally dispersed angles around the center of the wire-insertion bore 11-1 with substantial equal amounts (represented by the hatching in FIG. 3A). Accordingly, since the wire, inserted into the wire-insertion bore 11-1, is pressed from substantially equal dispersed directions around the axis of the wire with substantially equal forces, the wire can be gripped substantially at the center of the wire-insertion bore 11-1.

In order to release the gripping force, a user pinches the inner sleeve 10 by fingers of one-hand while pinching the outer sleeve 40 by fingers of another hand. Then, on pressing the inner sleeve 10 relative to the outer sleeve 40 toward the spring retainer 49 against the biasing force of the spring 60, the inner sleeve 10 is moved in a direction in which the inner diameter of the tapered inner surface 41a of the outer sleeve 40 is larger, as represented by a chained double-dashed line in FIG. 3. As a result, a clearance is produced between the outer surface of the center portion 17 of the inner sleeve 10 and the tapered inner surface 41a of the outer sleeve 40. And, the balls 31 and 33, received into the ball-set bores 21 formed at the center portion 17, move outward toward the clearance as shown in arrows in FIG. 3A.

When the balls 31 and 33 move outward in the ball-set bores 21 and therefore are separated from the wire W, the force by which each wire is gripped disappears or becomes weak. Then, the wires W can freely slide upward and downward through the wire-insertion bores 11. And, since the balls 31 and 33 are rotatably received in the ball-set bores 21, friction between the balls 31 and 33 and the wires W at sliding is so small that the wires W can slide smoothly through the wire-insertion bores 11.

After sliding the gripper 1 along the wires W for a desired length, the force pressing the inner sleeve 10 toward the spring retainer 49 is released. This causes the inner sleeve 10 to be biased by the spring 60, whereby the tapered outer surface 15a of the inner sleeve 10 contacts the tapered inner surface 41a of the outer sleeve 40. As a result, the balls 31 and 33 are pressed by the tapered inner surface 41a so as to grip the wires W.

Figure 5:
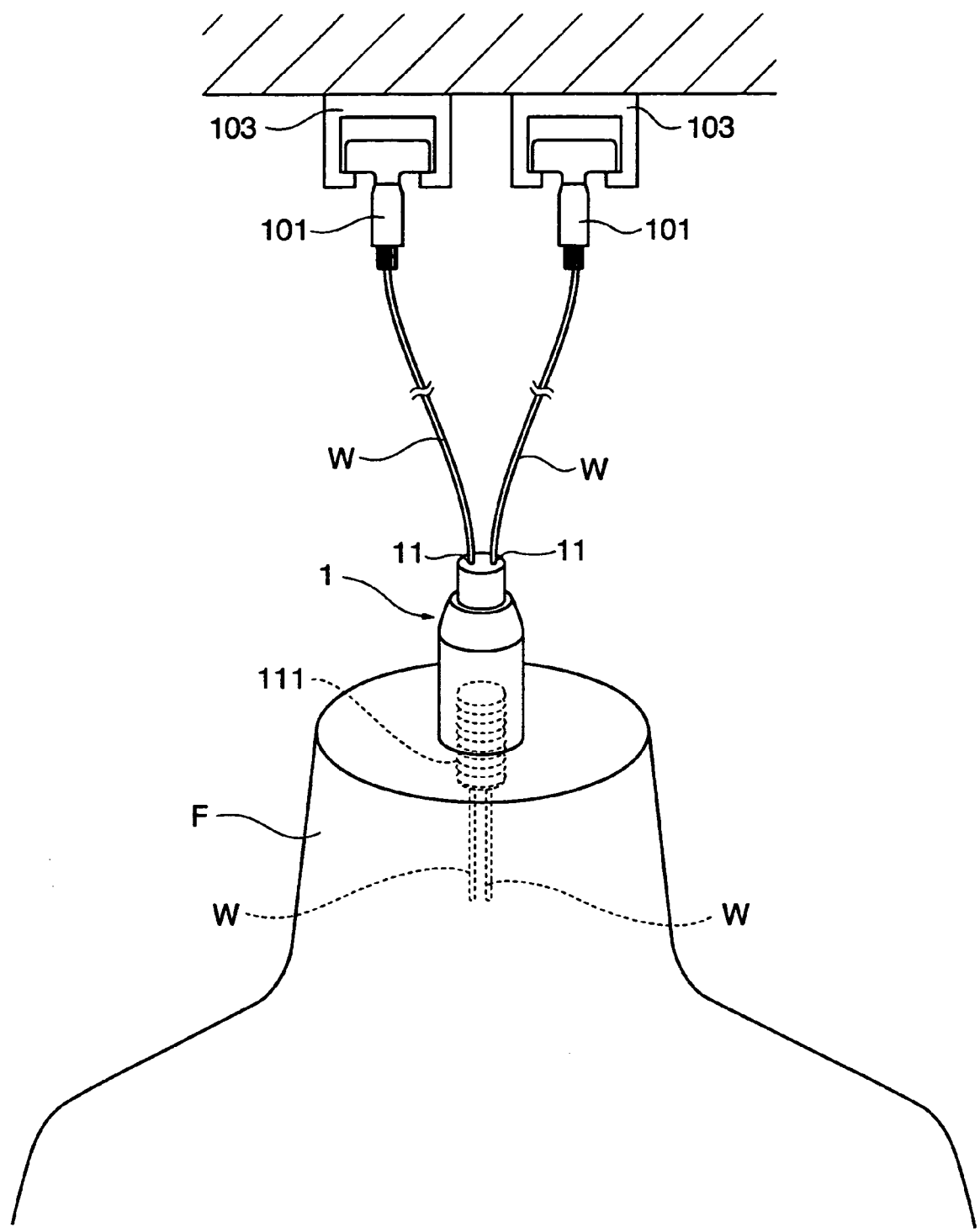
FIG. 5 shows a state in which a mannequin is suspended by the wire gripper of FIG. 1.

FIG. 5 shows a state in which a mannequin is suspended by the wire gripper of FIG. 1.

A hollow male thread 111 is fitted on a neck portion of a mannequin F, protruding from the neck portion. The wire gripper 1 of FIG. 1 is mounted to the mannequin F by engaging the thread 45 formed on the lower portion 43 of the outer sleeve 40 thereof with the male thread 111 of the mannequin F. To the wire gripper 1, two wires W are inserted and gripped. The wires W extend downward inside the mannequin F from the wire gripper 1 and also extend upward in rightward and leftward directions. And, upper ends of the wires W are each connected to one of two attachments 101 which are slidably coupled to a rail 103 mounted on a ceiling. Each upper end (the attachments 101) of the wires W and each lower end (the wire-insertion bores 11 of the wire gripper 1) thereof shape a quadrangular plane surface. By shaping a plane surface, the mannequin F can be suspended without a rotation of the mannequin around the axis of the wire W. In this case, although a distance between the lower ends of the wires is small as the distance between the wire-insertion bores 11 of the wire gripper 1, an effect for suppressing twisting of the stranded wire is demonstrated sufficiently.

When the mannequin F is suspended by the wire gripper 1, the outer sleeve 40 which is engaged with the female thread 111 of the mannequin F is pulled downward by the weight of the mannequin F. Then, the tapered inner surface 41a of the outer sleeve 40 is moved in the direction in which the tapered inner surface 15a of the inner sleeve 10 is widened, resulting in increasing the force in which the tapered inner surface 41a of the outer sleeve 40 presses the balls 31 and 33 inward. Accordingly, suspending an article to the wire gripper 1 increases the gripping force.

Figure 11B:
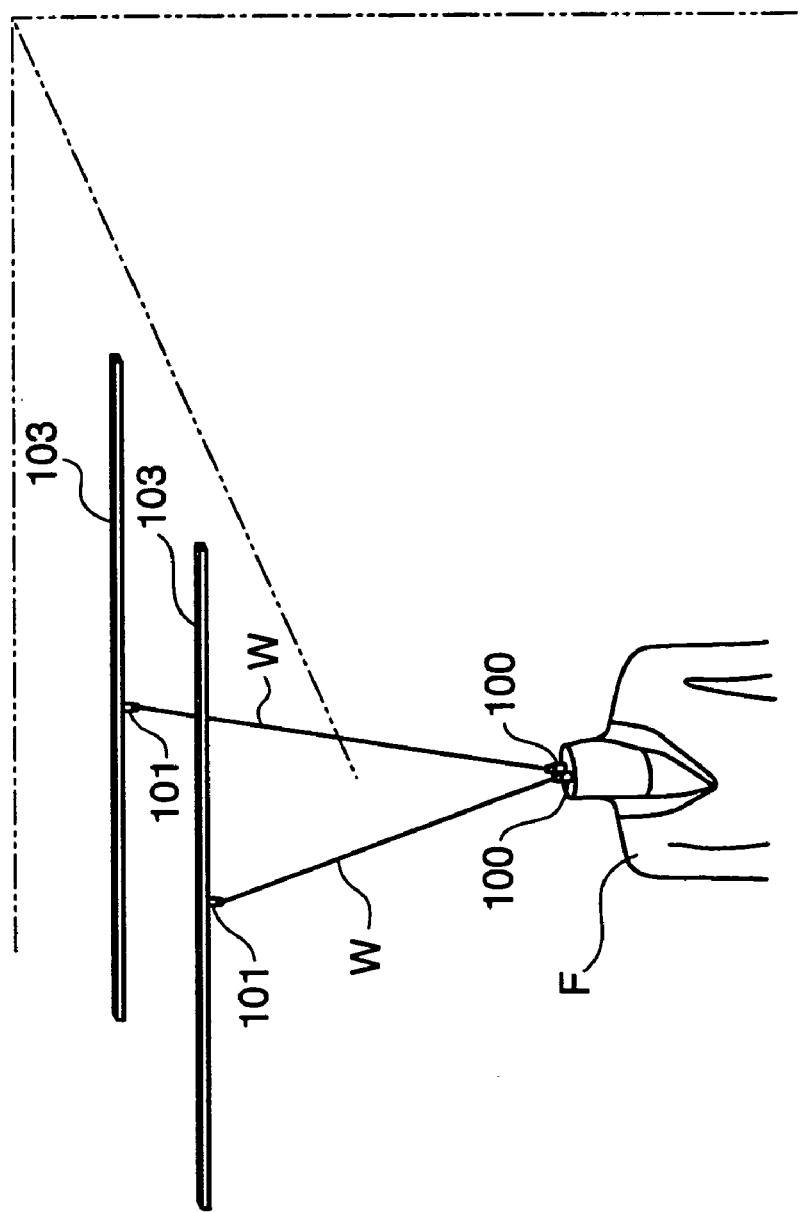
FIG. 11 show states in which mannequins are suspended by conventional methods.
Figure 11A:
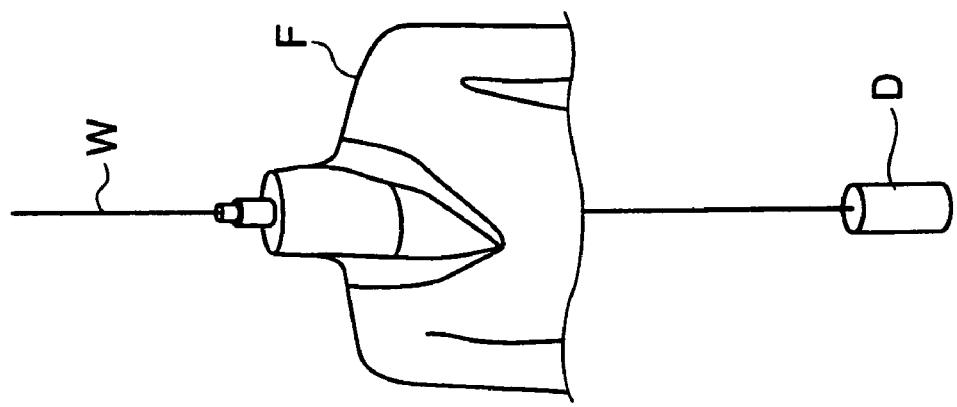

When two wires are necessary for suspending a heavy article or for preventing a wire from rotating around its axis, using one wire gripper 1 allows suspending the article by two wires. This provides a good appearance compared with the example shown in FIG. 11B, in which two wire grippers are used. And, one operation (pressing the inner sleeve 10 relative to the outer sleeve 40) allows the wire gripper 1 to be slid along the wires W at the same time so that a position of the suspending article can be easily changed along the wires W.

In addition, using a wire gripper having a wire guide cap, described below referred to FIG. 12, improves operationality and desinability.

Figure 6:
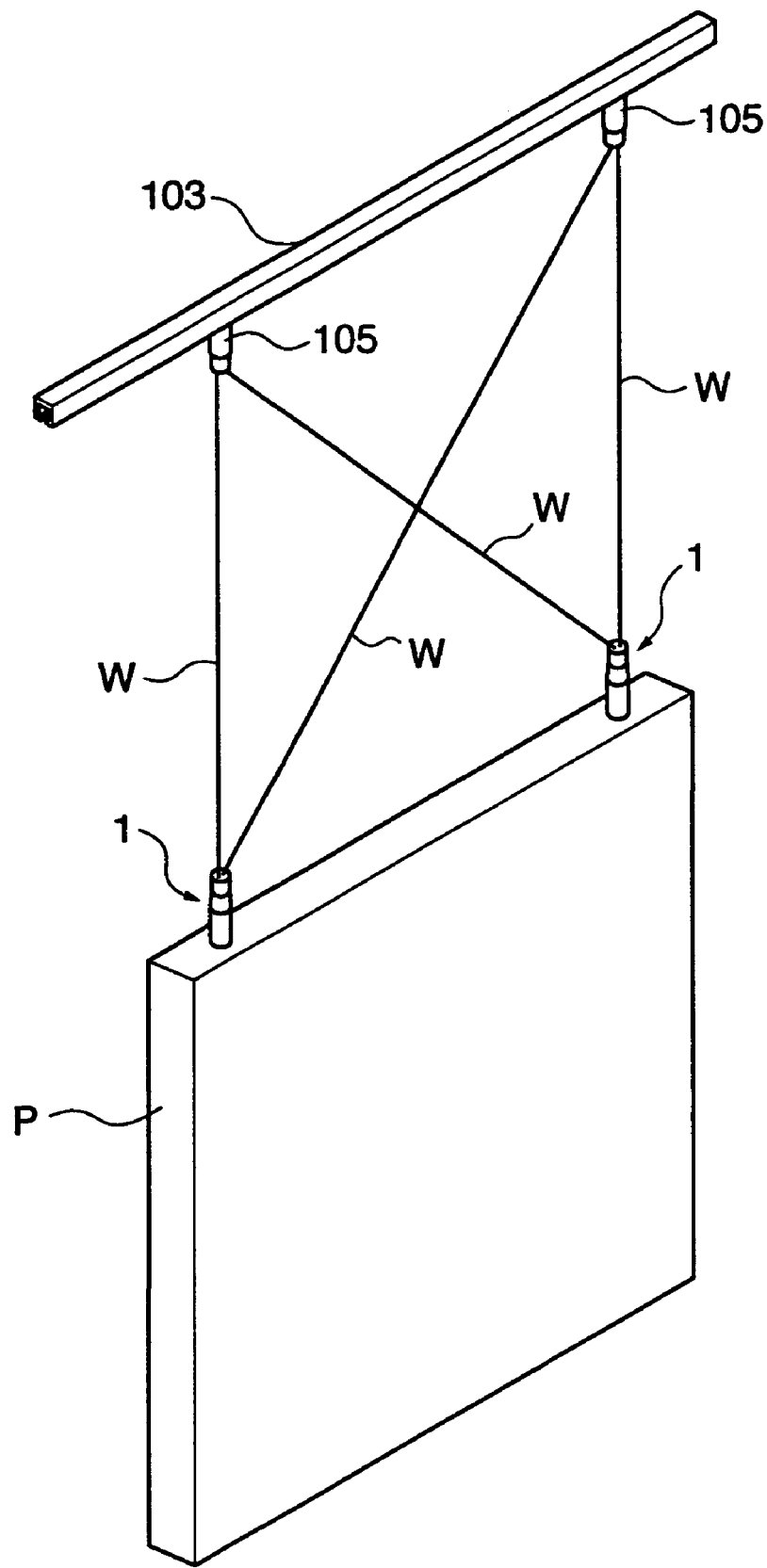
FIG. 6 shows another example of use of the wire gripper.

FIG. 6 shows another example of use of the wire gripper.

This example shows that a panel P is suspended by using the wire gripper 1. A male thread (not shown) is fitted around each upper corner of the panel P, and the female thread 45, formed at the outer sleeve 40 of the wire gripper 1, is engaged with the male thread. One of the two wires W, which are gripped to the wire gripper 1, extends directly upward and is connected to one wire attachment 105; the other wire W extend diagonally upward and is connected to the other wire attachment 105. In this case, for the wire attachment 105, the wire gripper 1 may be used. By suspending the panel P in such the manner, the panel P can be suspended without swinging in rightward and leftward directions in figure. For example, when a panel is suspended by using two wires, the panel swings in rightward and leftward directions easily. On the contrary, in this example, swinging of the panel P in rightward and leftward directions is suppressed by the diagonal wires W so that the panel P hardly swings in rightward and leftward directions. In addition, by using the wire gripper 1, single wire grip is required for gripping the ends of two wires W. And, it becomes easy to change a position of the suspending panel P.

In this example, using a wire gripper having a wire guide cap, described below referred to FIG. 12, improves operationality and desinability.

Figure 7:
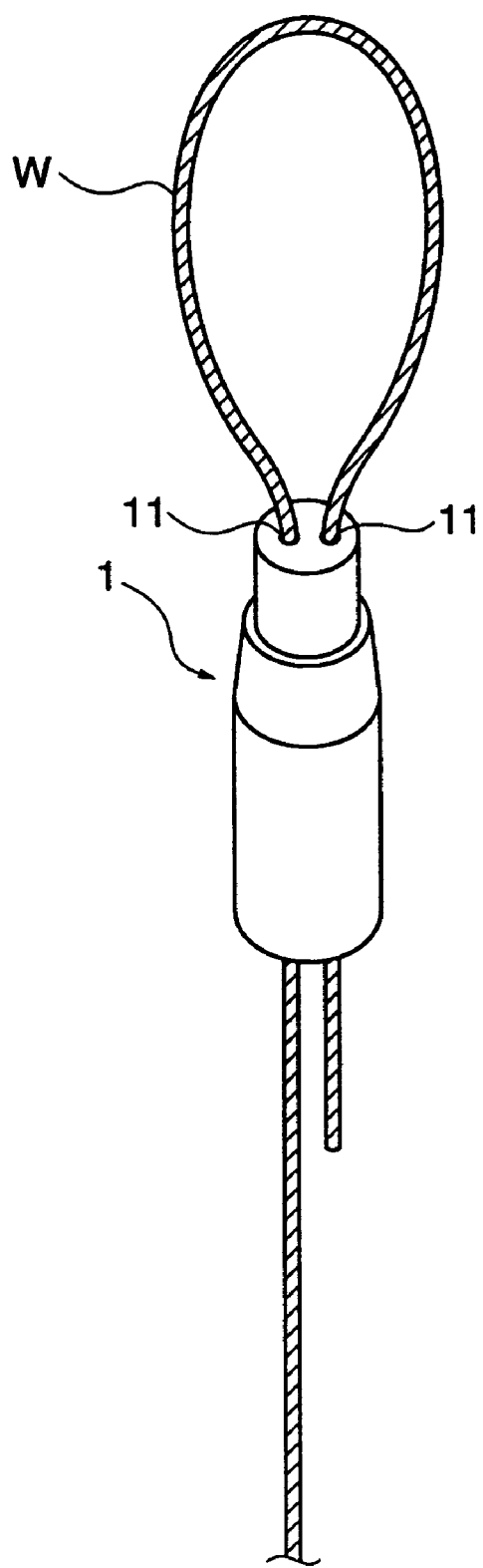
FIG. 7 shows an example of use of the wire gripper as a wire hanger.

FIG. 7 shows an example of use of the wire gripper as a wire hanger.

In this example, a wire is formed into a loop by using the wire gripper 1. The wire W is bent into a loop and both ends of the wire W are inserted into the wire-insertion bores 11 of the wire gripper 1 and gripped thereto. Sliding the wire W relative to the wire gripper 1 enables to change a size of the loop.

Figure 8A:
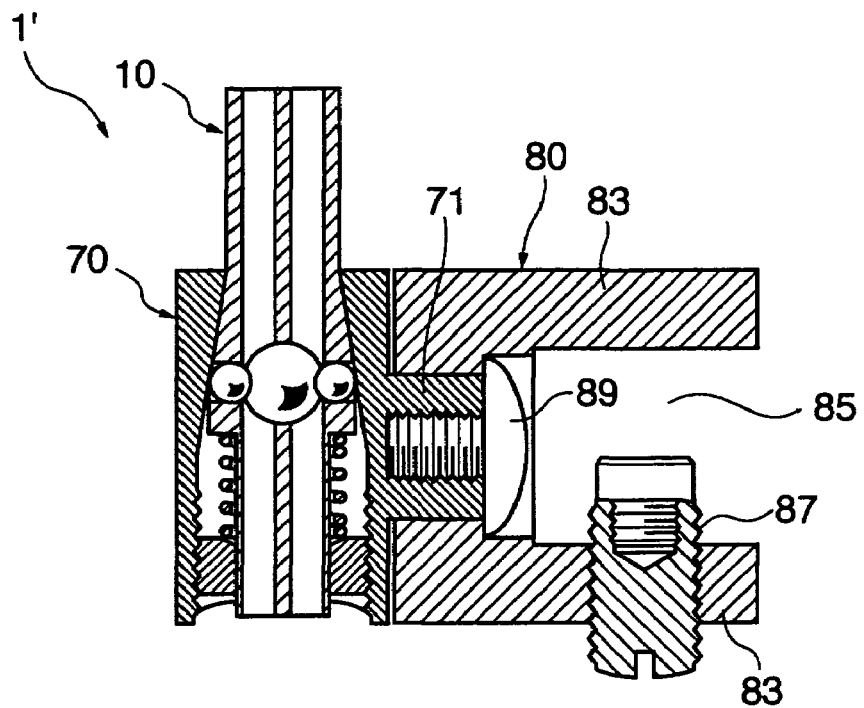
FIG. 8A is a front cross sectional view thereof.
Figure 8B:
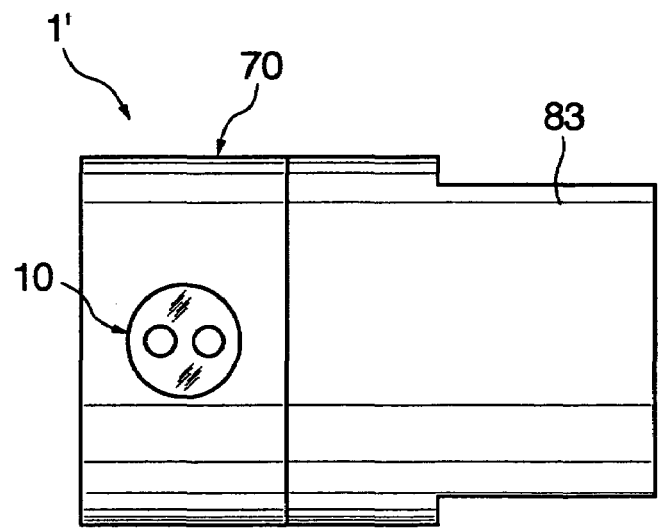
FIG. 8B is a plane view thereof.
Figure 8C:
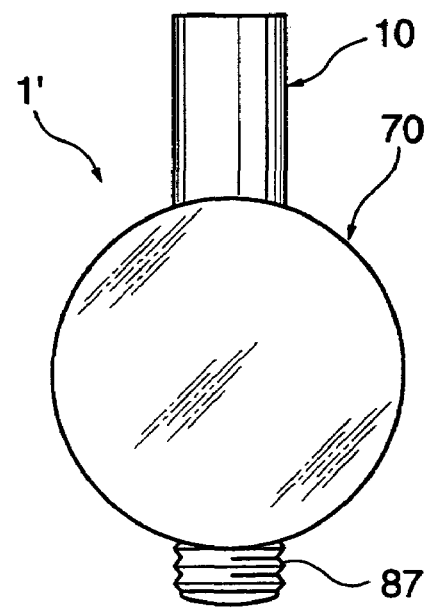
FIG. 8C is a side view thereof.

FIG. 8 show a structure of a wire gripper according to another embodiment of the present invention: FIG. 8A is a front cross sectional view thereof; FIG. 8B is a plane view thereof; and FIG. 8C is a side view thereof.

The wire gripper 1' has a shelf catch 80 for holding a shelf at a desirable height horizontally. The wire gripper 1' has the same structure and action as the wire gripper 1 except for the shape of an outer sleeve 70.

The outer sleeve 70, having a shape of a laid-down flat column, is formed with a shelf catch mounting portion 71 projecting outward from the side surface thereof.

The shelf catch 80, having a shape of a laid-down column, is formed with a horizontal groove 85, into which a shelf is inserted, at the side surface thereof. The shelf catch 80 has opposite portions 83 at both side of the groove 85. One of the opposite portions 83 is provided with a shelf holding member 87 having a height adjusting key. The shelf catch 80 is rotatably mounted to the shelf catch mounting portion 71 of the outer sleeve 70 by a screw 89.

Figure 9:
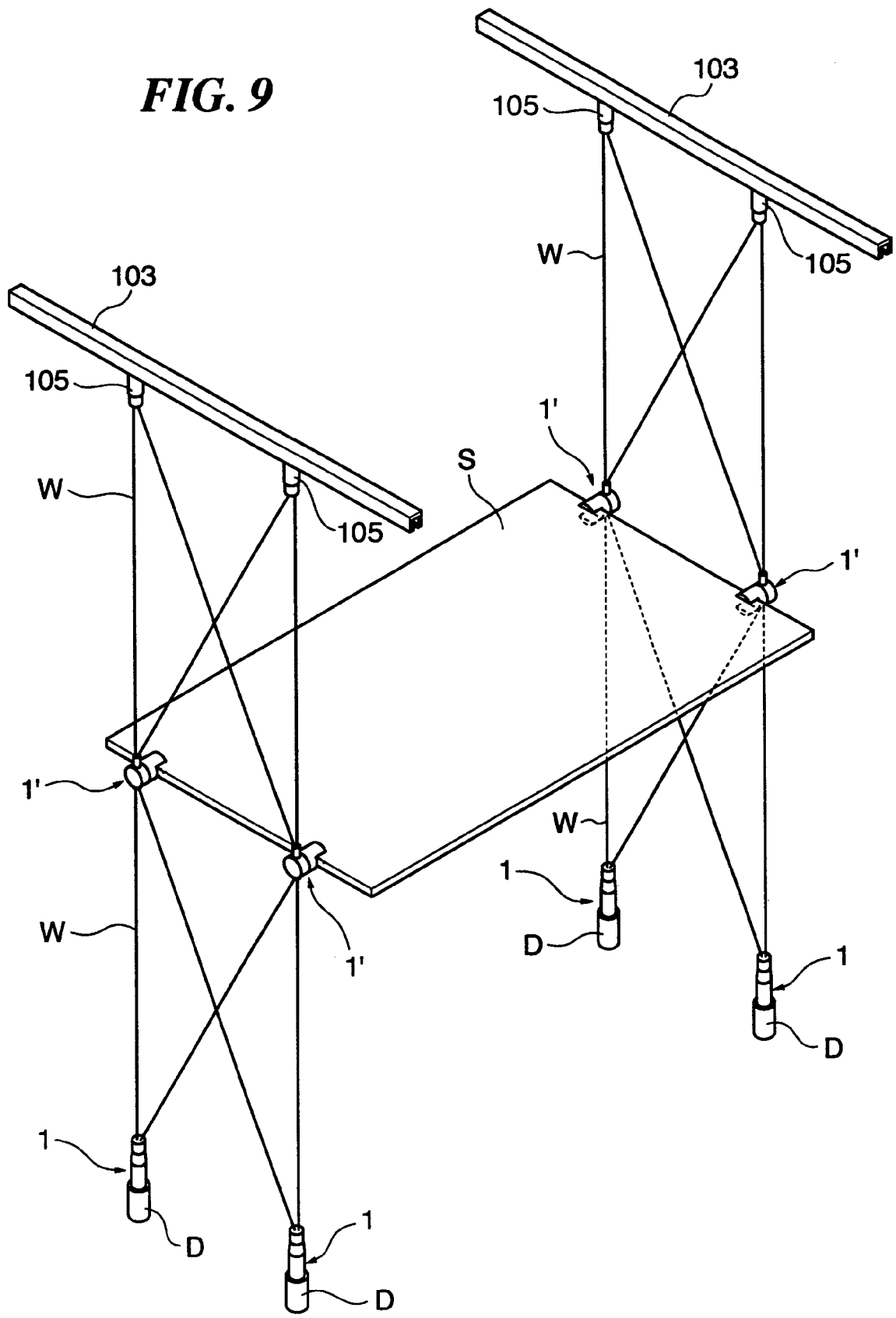
FIG. 9 shows a state in which a shelf is suspended using the wire gripper.

FIG. 9 shows a state in which a shelf is suspended using the wire gripper.

This example shows that a shelf S is held to wires W, hung from rails mounted on a ceiling, by using the wire grippers 1'. The shelf S is inserted into the groove 85 formed on the shelf catch 80 of the wire gripper 1' of FIG. 8A and fixedly caught between the upper portion 83 and the shelf holding member 87.

One of the two wires W, which are gripped to the wire gripper 1', extends directly upward and is connected to one wire attachment 105; the other wire extend diagonally upward and is connected to the other wire attachment 105. In this case, for the wire attachment 105, the wire gripper 1 may be used. And, one of the two wires W extends directly downward and is connected to the wire gripper 1 mounted on one weight D; the other wire extend diagonally downward and is connected to the wire gripper 1 mounted on the other weight D. Using the wire gripper 1' enables suspending the shelf S horizontally without swinging in forward and backward directions. And, in exchange for the weight D, a wire attachment may be placed on a floor.

Figure 10A:
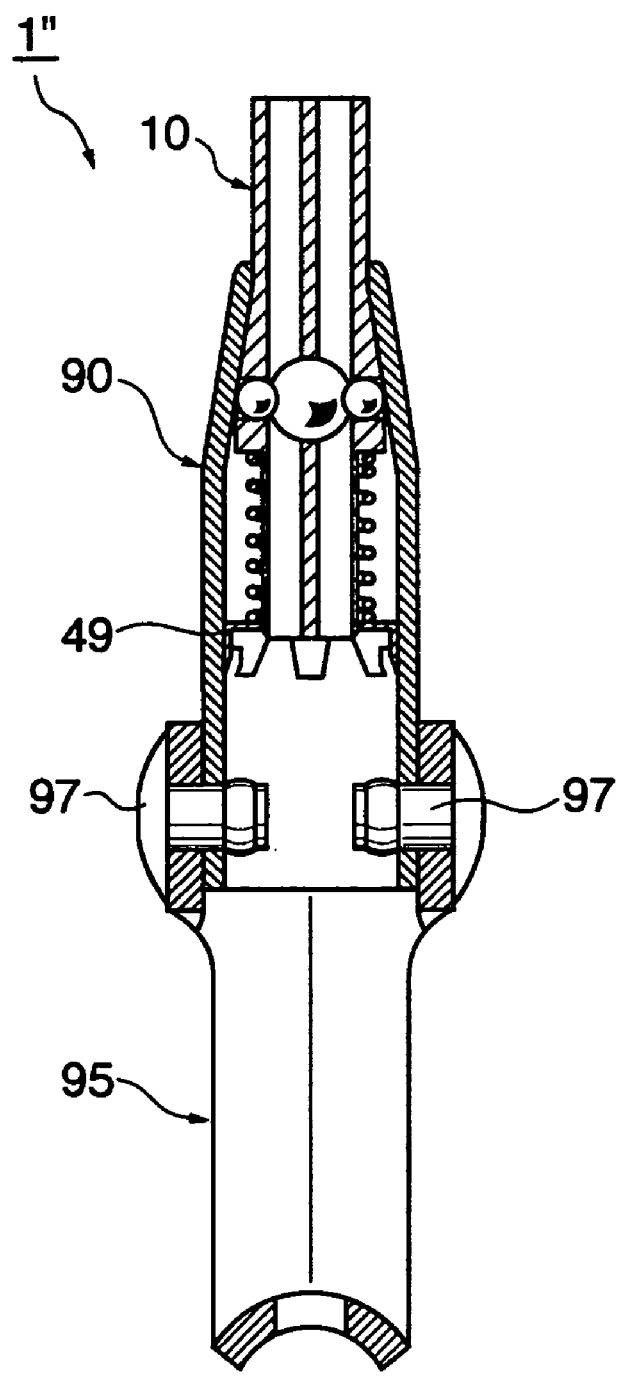
FIG. 10A is a front cross sectional view thereof.
Figure 10B:
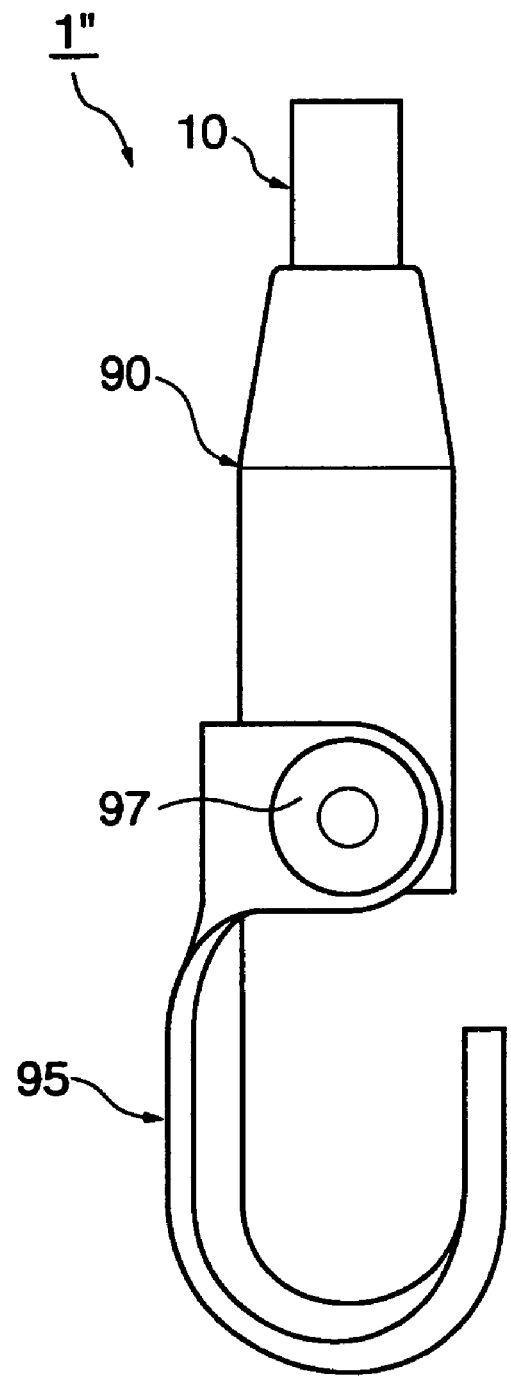
FIG. 10B is a side view thereof.

FIG. 10 show a structure of a wire gripper according to another embodiment of the present invention: FIG. 10A is a front cross sectional view thereof; and FIG. 10B is a side view thereof.

The wire gripper 1" has a hook for hooking an article. The wire gripper 1" has the same structure and action as that of the wire gripper 1 except for the structure of an outer sleeve 90.

The outer sleeve 90 is not formed with a thread at the lower hollow bore thereof. And, the spring retainer 49 is forced into the lower hollow bore of the outer sleeve 90 and fixed thereto. And, a hook 95 is mounted to the lower portion of the outer sleeve 90 by rivets 97.

Using the wire gripper 1" enables suspending an article, which is hooked on the hook 95, without a rotation of the article around the axis of the wire.

Figure 12A:
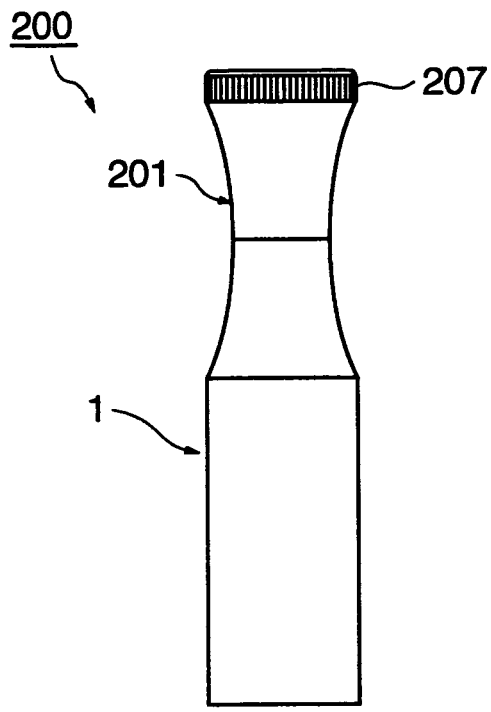
FIG. 12A is a front view thereof.
Figure 12B:
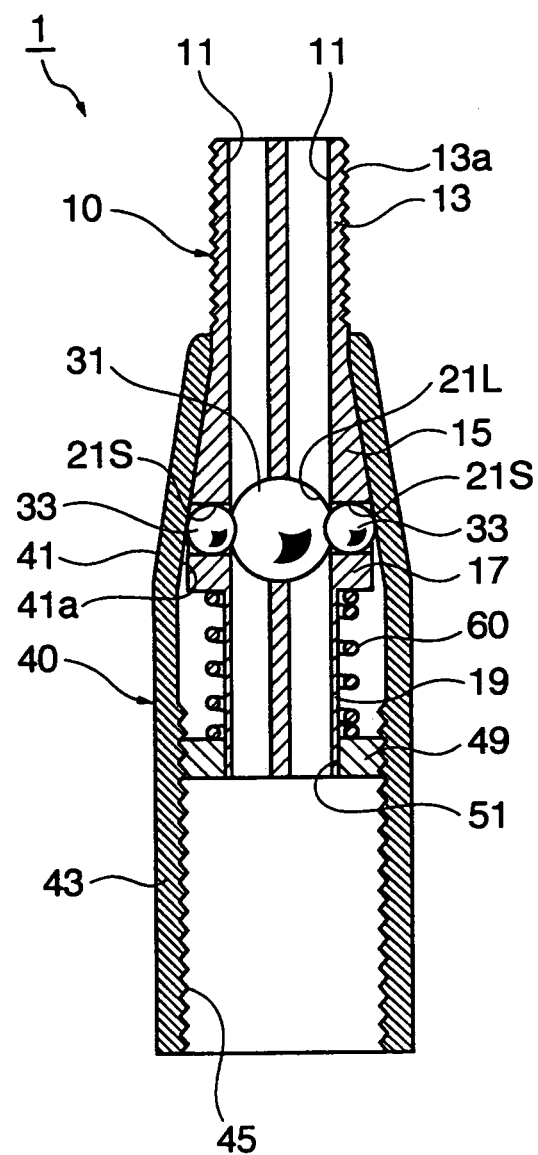
FIG. 12B is a front cross sectional view showing a structure of a wire gripper body of the wire gripper.
Figure 12C:
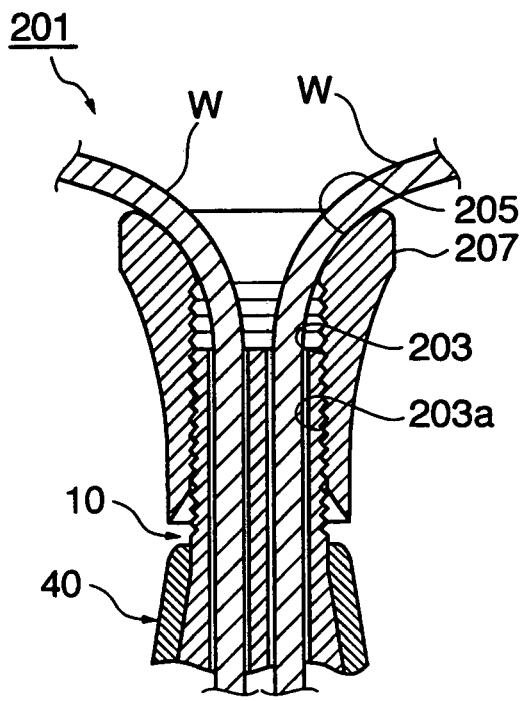
FIG. 12C is a front cross sectional view showing a structure of a cap.

FIG. 12 show a structure of a wire gripper according to another embodiment of the present invention: FIG. 12A is a front view thereof; FIG. 12B is a front cross sectional view showing a structure of a wire gripper body of the wire gripper; and FIG. 12C is a front cross sectional view showing a structure of a cap. FIG. 12A also shows a clearance between the cap and the gripper and a wire guided by the cap.

A wire gripper 200 is provided with a wire guide cap 201 which is engaged with the wire gripper 1 of FIG. 1. As shown in FIG. 12B, the upper portion 13 of the inner sleeve 10 protrudes from the upper opening of the outer sleeve 40 by biasing upward by the spring 60. The protruded upper portion 13 is formed with an outer thread 13a on an outer surface thereof. The wire guide cap 201 is engaged with the outer thread 13a.

The wire guide cap 201 has a wire-insertion bore 203 penetrating in an axis direction of the wire gripper 1 as shown in FIG. 12C. The wire-insertion bore 203 is formed with an inner thread 203a at the almost lower half inner surface thereof. With the inner thread 203a, the outer thread 13a of the upper portion 13 of the inner sleeve is engaged. And, the wire-insertion bore 203 is formed with a tapered inner surface 205 which is widened toward the upper end thereof (in the opposite direction to the wire gripper) from the inner thread 203a.

When the inner thread 203a of the wire guide cap 201 is fully engaged with the outer thread 13a of the inner sleeve 10, no clearance exists between the wire guide cap 201 and the outer sleeve 40, and therefore it becomes impossible for the inner sleeve 10 to be pressed downward relative to the outer sleeve 40. Thus, engaging the wire guide cap 201 allows the wire gripper 200 to be locked keeping to be gripped. Accordingly, the inner sleeve 10 is prevented from being pressed carelessly and therefore from releasing the gripping force.

When the gripping force should be released, the cap 201 is moved upward by loosing the inner thread 203a relative to the outer thread 13a so as to produce a clearance between the cap 200 and the outer sleeve 40 (as shown in FIG. 12C). As a result, the inner sleeve 10 can be pressed downward relative to the outer sleeve 40.

The outer surface of the cap 201 has a knurled surface 207 for easy handling of the cap 201.

As shown in FIG. 5, in many cases in which the wire gripper 200 is used, two wires extend upward (or downward) from the wire gripper 200 in the rightward and leftward directions (or the backward and forward directions). So, in order to guide the wires W in each extending direction, the wire guide cap 201 is provided with the tapered inner surface 205, which is widened towards the upper end. Accordingly, by providing the inner sleeve with a portion which guides the wires W so as to extend along the actual extending curvatures, a wire grip releasing operation and a wire sliding operation can be smoothly performed. In addition, the wire bends smoothly, thereby to prevent the wire from being kept curved.

Next, examples of use of the wire gripper 200 will be explained. The wire gripper 200 is used in the embodiments of FIG. 5, FIG. 6 and FIG. 9 and also in the modification embodiments of FIG. 7, FIG. 8 and FIG. 10.

Figure 13:
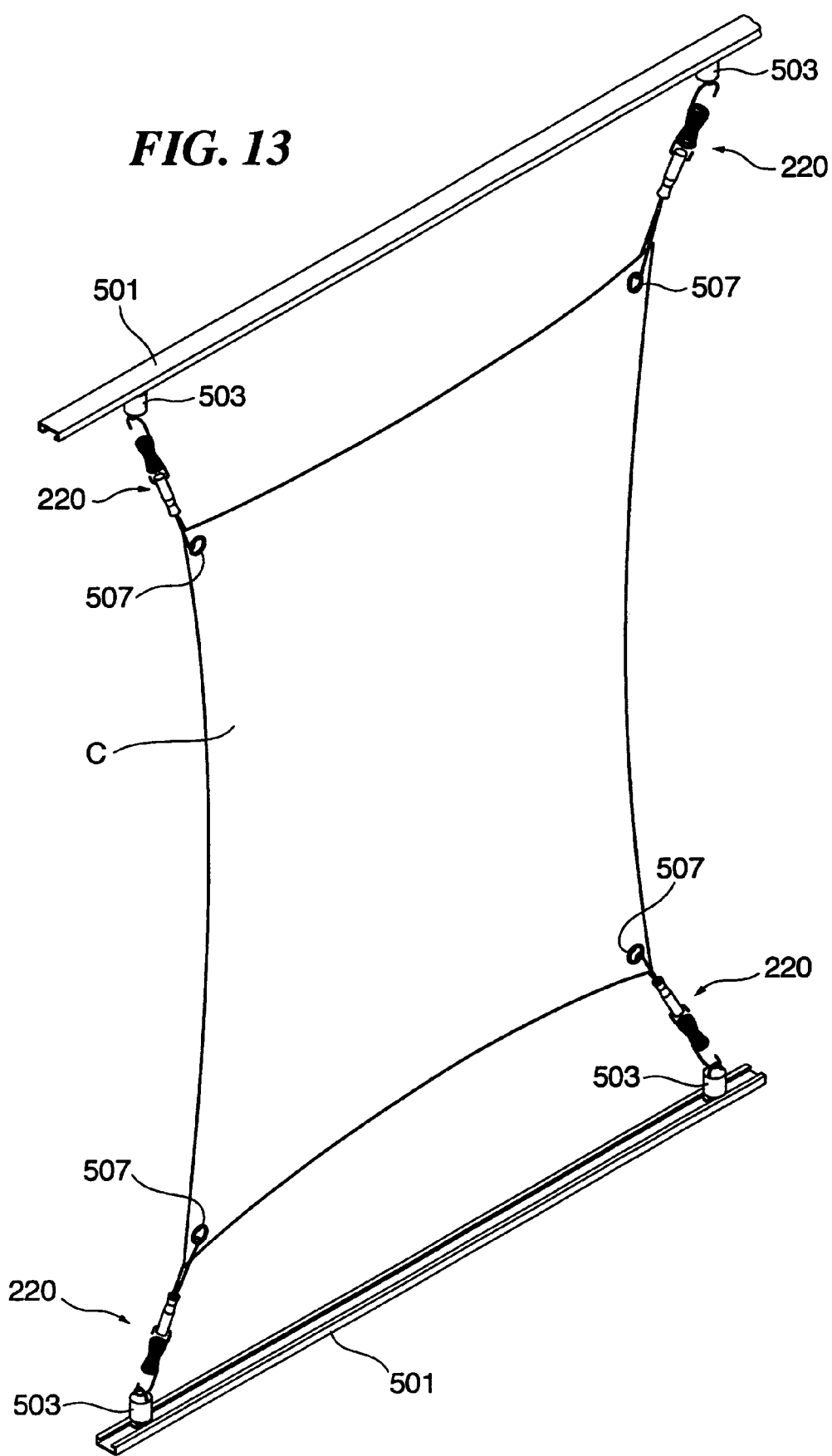
FIG. 13 shows a canvas spreading system according to the present invention.

FIG. 13 shows a canvas spreading system according to the present invention.

FIG. 14 show a part (a corner of the canvas) of the canvas placing system of FIG. 13 and modification examples thereof.

This example shows a system for spreading a square canvas C (including a cloth, a mesh, a resin sheet and the like) between a ceiling and a floor by using the wire gripper 200. By adjusting a tension of the canvas C and changing the kind of the canvas C, the canvas C can be used for various applications such as a screen, a partition and an ornamental article.

Two rails 501 are mounted on the ceiling and the floor in parallel. To each rail 501, two wire attachments 503 are slidably and fixably connected. The square canvas C is formed with an eyelet 507 at each corner thereof. The diagonally positioned eyelets 507 are pulled in the opposite directions by two wire gripper assemblies 220 each connected to the attachment 503, resulting in that the canvas C can be spread between the ceiling rail 501 and the floor rail 501.

Figure 14A:
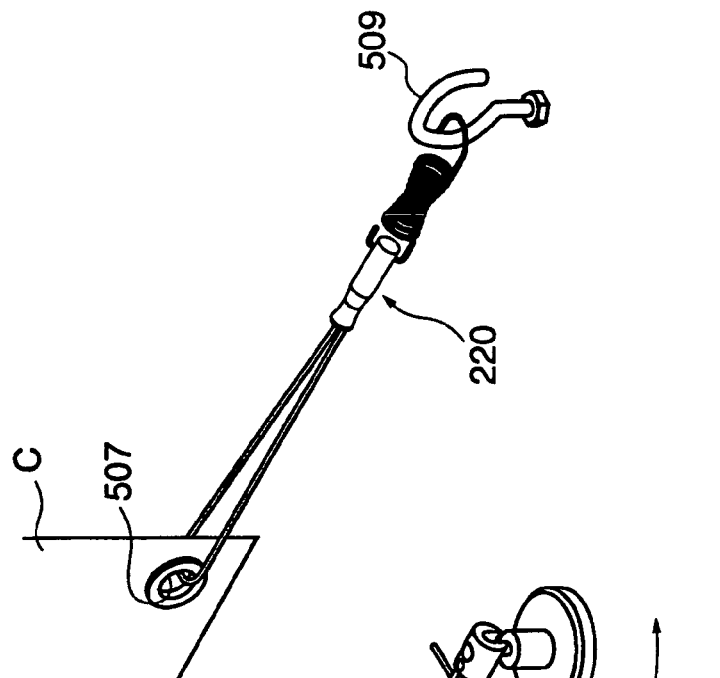
FIG. 14 show a part (a corner of the canvas) of the canvas placing system of FIG. 13 and modification examples thereof.

As shown in FIG. 14A, the wire gripper assembly 220 comprises a wire gripper 200 (a wire gripper in which the wire gripper 1 in the example of FIG. 7 is exchanged for the wire gripper 200), to which both ends of a loop wire W are gripped, and a spring 221 series-connected to the wire gripper 200. The spring 221 is formed with hooks 223 and 225 at the both ends thereof. One hook 223 is fixedly connected to the end of the outer sleeve 40 of the wire gripper 200.

Both end of the wire W are gripped to the wire gripper 200 after the wire W is passed through the eyelet 507 of the canvas C. Thus, the canvas C (the eyelet 507) is coupled to the wire gripper assembly 220. And, the wire gripper assembly 220 is coupled to the rails 501 by hooking the other hook 225 of the spring 221 of the wire gripper assembly 220 to the attachment 503 coupled to the rail 501. As a result, the four corners of the canvas C are diagonally pulled and connected to the attachments 503.

In this example, although the canvas C is spread while giving tension adjustable by the spring 221, in order to adjust the tension of the canvas C more widely, it is necessary to change a length of the wire W (a distance between the wire gripper 200 and the eyelet 507). In such a case, using the wire gripper 200 capable of gripping two wires at desirable positions thereof makes it easy to adjust the length of the wire. In addition, since one wire gripper is used per one eyelet 507, a simple and good appearance can be given.

In this example, the canvas C is formed with the eyelet 507 at each corner thereof, however, it is also possible that a hook is attached at each corner or that each corner of a canvas is turned thereon so as to form a doubled canvas portion for connecting the wire.

Figure 14B:
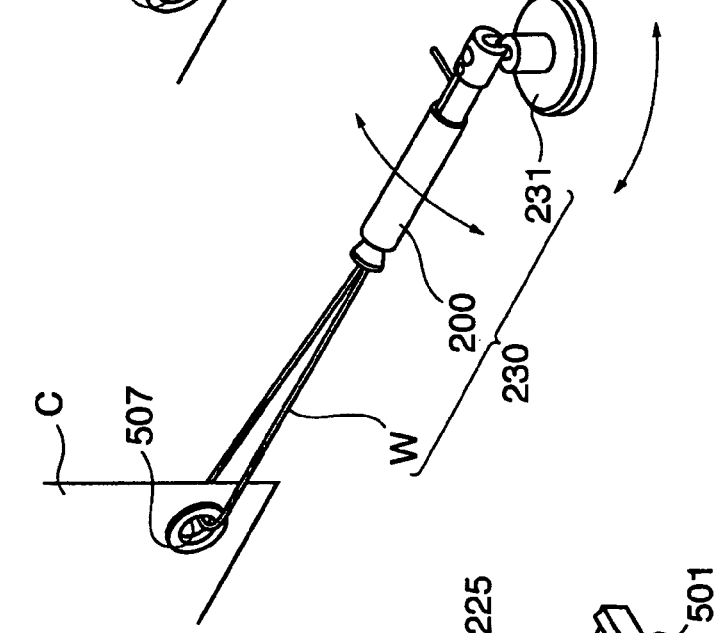
Figure 14C:
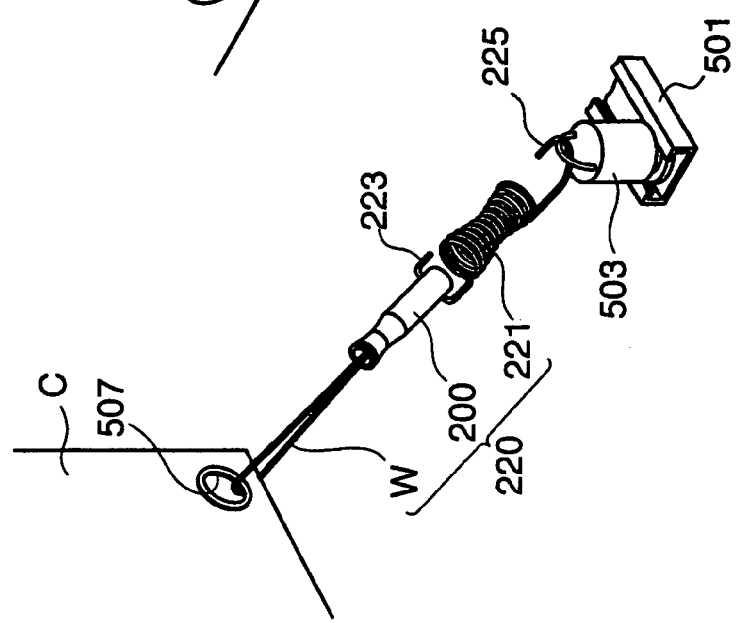

And, a coupling portion between the canvas and a fixture can be changed as shown in FIG. 14B and FIG. 14C. In these examples, the canvas is not connected to the rail but directly coupled to the ceiling or the floor.

In an example shown in FIG. 14B, the eyelet 507 formed on the canvas C is connected to the floor via a wire gripper assembly 230. The wire gripper assembly 230 comprises the wire gripper 200 and a fixed part 231 which is fixedly mounted to the floor. The wire gripper 200 is rotatable relative to the fixed part 231. In addition, the wire gripper 200 contains a screw-type tension-adjusting member inside. The screw-type tension-adjusting member can adjust tension of the wire by rotating the wire gripper 200 relative to the fixed part 231. The tension-adjusting member has the same action as that of the spring 221 of FIG. 14A.

In an example shown in FIG. 14C, the wire gripper assembly 220 of FIG. 14A is connected to a hook 509 fixedly mounted on the floor.

In addition, it is possible that a spring is connected between the wire and an article to be spread (the canvas).

By using the spring, tension of an article to be spread (the canvas) can be adjusted easily. Alternatively, even if slack or weak will occur, the article can be stably spread without remarkable decreasing of the tension.

Figure 15:
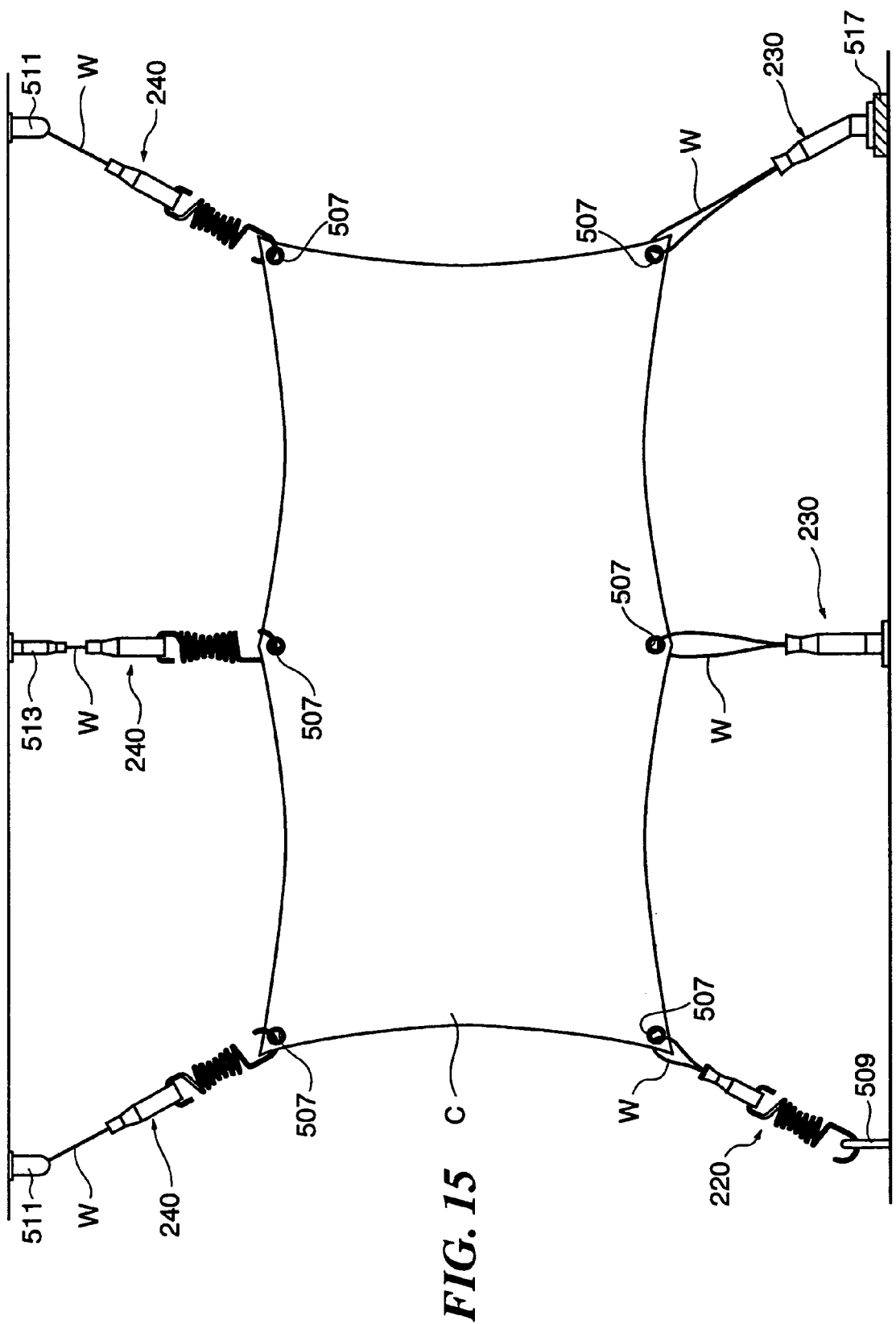
FIG. 15 shows a canvas placing system according to another embodiment of FIG. 13.

FIG. 15 shows a canvas placing system according to another embodiment of FIG. 13.

This example shows a system for spreading a canvas C in substantially the same manner as the FIG. 13 except that the canvas C is connected to the ceiling and the floor at each middle portion of the upper and lower edges in addition to the four corners.

The canvas C is formed with an eyelet at each middle portion of the upper and lower edges in addition to the four corners thereof.

The upper edge of the canvas C is connected to attachments, fixedly mounted on the ceiling, by using a wire gripper assembly 240. The wire gripper assembly 240 comprises a wire gripper capable of gripping one wire and a spring. A hook of the spring is hooked on the eyelet 507 formed at the upper edge of the canvas C. To the attachment 511 to which each upper corner of the canvas C is coupled, one end of a wire W is fixedly connected previously. The other end of the wire W is gripped to the wire gripper assembly 240. On the other hand, the attachment 513, to which the upper middle edge of the canvas C is coupled, comprises a wire gripper capable of gripping one wire W and a fixed part which is fixedly mounted on a fixture such as a ceiling. Both end of the wire W is gripped to the attachment 513 and the wire gripper assembly 240.

The lower corners and the lower middle edge of the canvas C is connected to the floor by using the wire gripper assembly 220 (having a spring) shown in FIG. 14A and the wire gripper assembly 230 (having a fixed part) shown in FIG. 14B. A wire W of the wire gripper assembly 220 is passed through the eyelet 507 formed at the lower left corner of the canvas C. The spring of the wire gripper assembly 220 is hooked on a hook 509 fixedly mounted on the floor. And, a wire W of the wire gripper assembly 230, fixedly mounted on the floor, is passed through the eyelet 507 formed at the lower middle edge of the canvas C. And, a wire W of the wire gripper assembly 230, fixedly mounted on a weight 517 placed on the floor, is passed through the eyelet 507 formed at the lower left corner of the canvas C.

Figure 16:
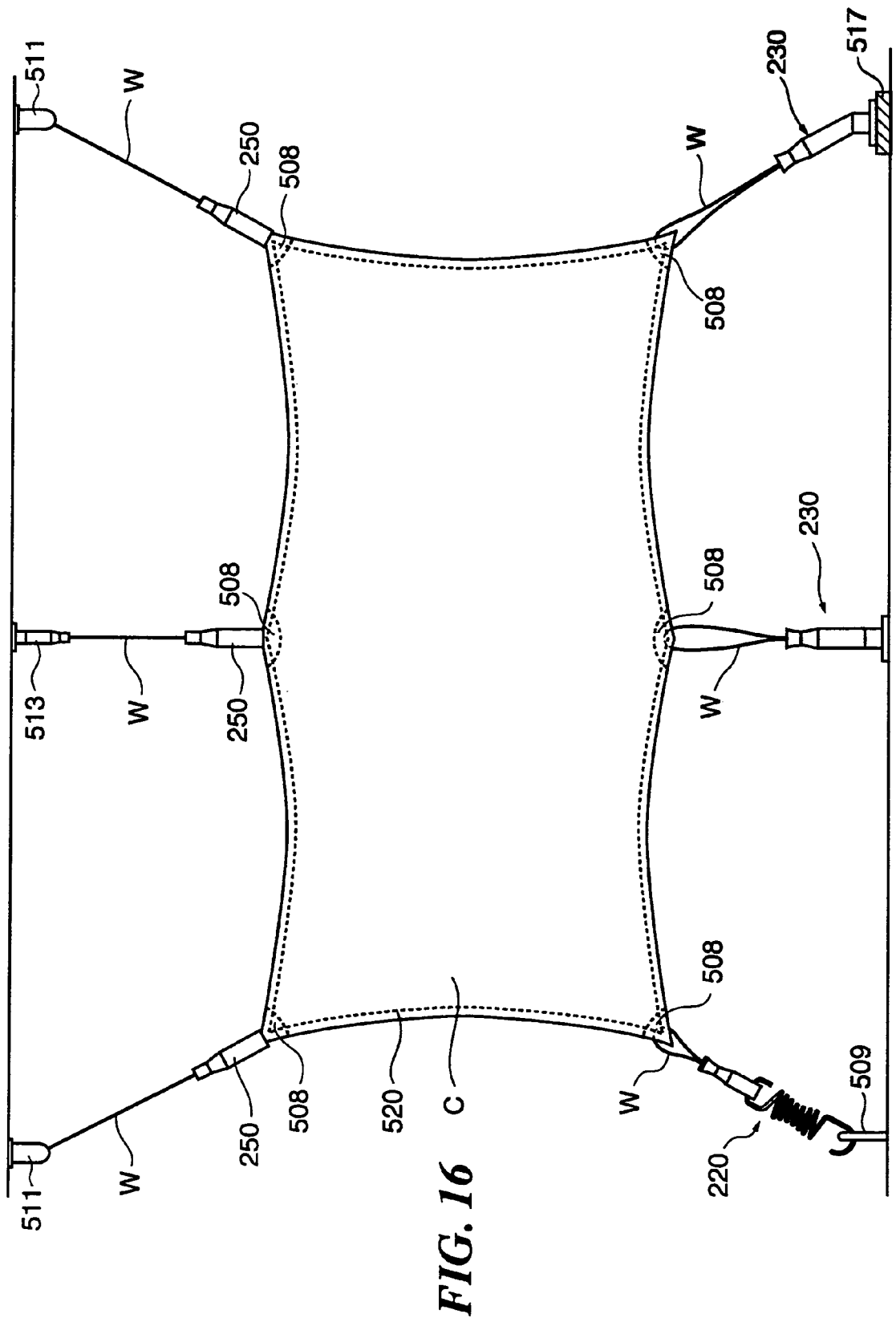
FIG. 16 shows a canvas placing system according another embodiment of FIG. 15.

FIG. 16 shows a canvas placing system according another embodiment of FIG. 15.

In this example, the canvas C is formed with wire-connecting portions 508 in exchange for the eyelets. The wire-connecting portion 508 is made such that the canvas is turned thereon so as to form a doubled canvas portion. A wire gripper 250 capable of gripping one wire W is fixedly connected to each upper corner and the upper middle edge of the canvas C. And, the wire grippers 250 are connected to attachments 511 and 513, which are fixedly mounted on the ceiling, via wires W. On the other hand, the lower edge of the canvas C is coupled to the floor in the same manner of FIG. 15 except that the wire is passed through the wire-connecting portion 508 of the canvas C.

In addition, a cord 520 is set by sewing along each edge of the canvas C. The cord 520 includes an elastic and flexible urethane cord or a wire. The cord enables keeping each edge of the canvas C with giving tension thereto.

As shown in FIG. 15 and FIG. 16, even when the wire gripper capable of gripping one wire is used, a length of the wire can be adjusted, however, in which case, an attachment or a wire gripper for holding or gripping each of the upper and lower end of a wire is required. For example, when the upper edge of the canvas is connected to the ceiling in FIG. 15, the attachment 511, to which one end of the wire W is fixedly connected, and the wire gripper assembly 240, to which the canvas is connected, are required. On the contrary, when the lower edge of the canvas is connected to the floor in FIG. 15, one wire gripper assembly 220 or 230 capable of gripping both ends of a wire is used. That is, one connecting portion requires only one wire gripper assembly. Accordingly, by using such wire gripper assembly 220 or 230, the following operations; a canvas is formed with a connecting portion through which a wire is passed; and, such wire gripper assembly is connected to a fixture; are necessary for adjusting the length of the wire. In addition, a design diversity of the canvas C can be extended.

Figure 17:
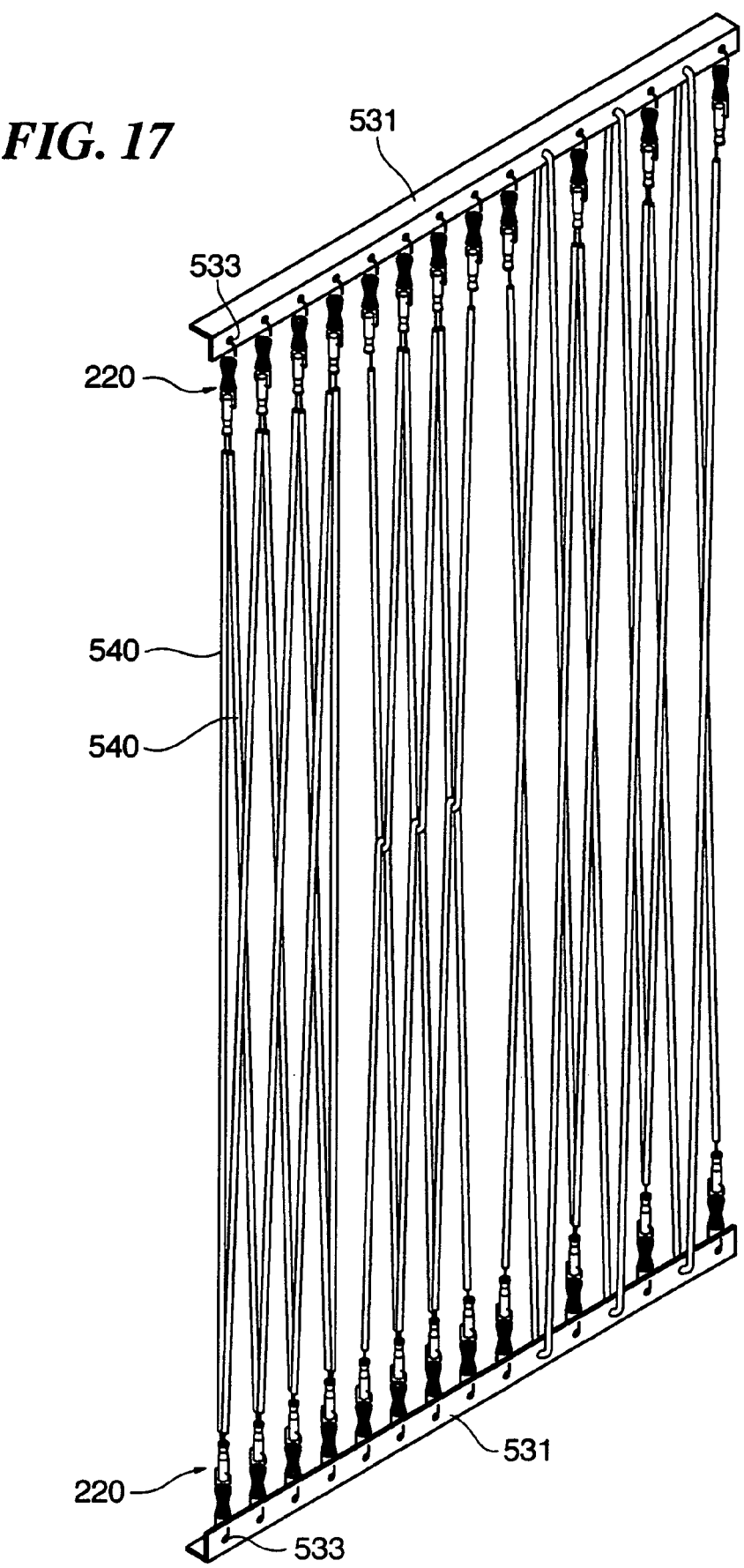
FIG. 17 shows a partition system according to the present invention.

FIG. 17 shows a partition system according to the present invention.

This example shows a system for dividing a plane by crossing plural strands between opposite surfaces such as a ceiling and a floor so as to construct a plane composed of the strands. The strand includes a wire with urethane coating, for example. In this case, the urethane coating of the strand is stripped at the both ends so as to expose the wire.

A pair of L-form bars 531 are fixedly mounted on a ceiling and a floor in parallel each other. Each bar 531 is formed with plural openings 533 in the length direction. Ends of one or two strands 540 are gripped to the wire gripper assembly 220 (shown in FIG. 14A), comprising a wire gripper and a spring series-connected thereto, and pulled in the opposite directions between the bars 531.

The hook of the spring of the wire gripper assembly 220 is hooked on the opening 533 of the bar 531. And, the wire gripper of the wire gripper assembly 220 grips one or two strands 540. In the left part in the figure, an end of each of the two strands 540 is gripped to the wire gripper assembly 220 coupled to one bar 531. The two strands extend toward the other bar 531 in rightward and leftward directions in figure from the wire gripper assembly 220. And, the other end of each of the two strands is gripped to the adjacent wire gripper assemblies 240, respectively, which are connected to the bar 531 next to each other. As a result, the strands 240 are crossed between the bars 531 with being intersected each other in the intermediate space between the bars 531.

In the middle part in the figure, the strand is crossed between the adjacent wire gripper assemblies 230 connected to the bar 531. And, the crossed strand 540, connected to one bar 531, is intersected with the crossed strand 540, connected to the other bar 531, at the intermediate space between the bars 531.

And, in the right part in the figure, the wire gripper assemblies 220 are alternately connected to the openings 533 of the bar 531. The strand 540 is gripped to the wire gripper assembly 230, connected to one bar 531, at the one end thereof and extends toward the other bar 531. Then, after the strand 540 passes through the opening 553 of the bar 531, the strand 540 is turned back toward the former bar 531 and gripped to another wire gripper assembly 220, which is positioned next to the former wire gripper assembly 220. As shown in this example, there is no necessity of connecting the wire gripper assembly 230 in all openings 533.

The partition system in this example is used for a partition separating two spaces or an ornamental article installed in front of a wall surface. Various decoration effects can be expected by changing a color of the strand 540 (the urethane coating). And, by using the wire gripper capable of gripping two wires, both ends of the strand are terminated with a good appearance. In addition, as shown in FIG. 17, it is possible to cross the strand in various forms.

Hereinafter, examples of a system for suspending an article (a signboard, a lighting apparatus, a shelf and the like) using the wire gripper according to the present invention will be explained.

Figure 18:
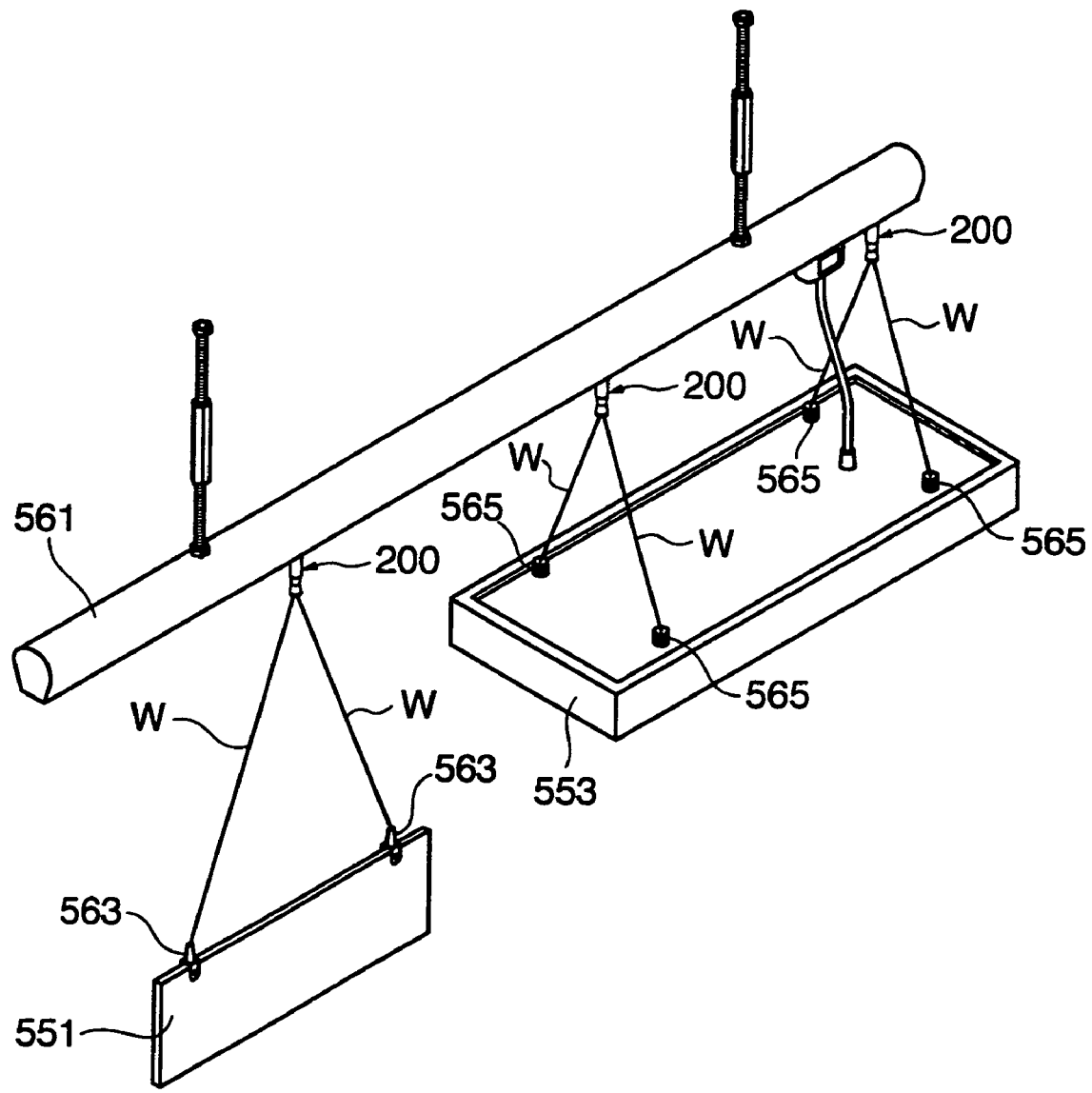
FIG. 18 shows an article suspending system according to the present invention.

FIG. 18 shows an article suspending system according to the present invention.

This example shows a system for suspending a signboard 551 and a lighting apparatus 553 from a rail 561 hung from a ceiling.

The signboard 551 is suspended using one wire gripper 200 from the rail 561 and the lighting apparatus 553 is suspended using two wire grippers 200 from the rail 553.

In a case of suspending the signboard 551, the wire gripper 200 is slidably connected to the rail 561 (the way for connecting the wire gripper to the rail is not explained). Around each upper corner of the signboard 551, an attachment 563, to which one end of a wire W is fixedly connected, is mounted. And, the other ends of the wires W are gripped to the wire gripper 200.

This example, as with the example of suspending a mannequin of FIG. 5, shapes a plane surface by each upper end of the wires W and each lower end thereof. Accordingly, the signboard can be suspended from the rail 561 without a rotation of the signboard around the axis of the wire W.

And, in a case of suspending the lighting apparatus 553 according to this example, two wire grippers 200 are slidably connected to the rail 561. And, two attachments 565, each to which a lower end of a wire W is fixedly connected, are separately mounted at each end portion of an upper surface of a casing of the lighting apparatus 553. And, two wires W of the attachments 565 are gripped to the wire gripper 200 at the upper ends thereof.

In order to suspend the wide lighting apparatus safely, like this example, it is preferable to suspend the apparatus using plural wires at plural positions (in this example, four positions). Conventionally, such the case requires plural wire grippers or attachments for gripping or holding each upper end of the plural wires. On the contrary, by using the wire gripper 200 in this embodiment, the upper ends of the two wires can be gripped to the one wire gripper 200. Therefore, the number of the wire gripper or the attachment to be used can decrease. And, as shown in this figure, the lighting apparatus 553 can be suspended from the linear rail 561.

Figure 19:
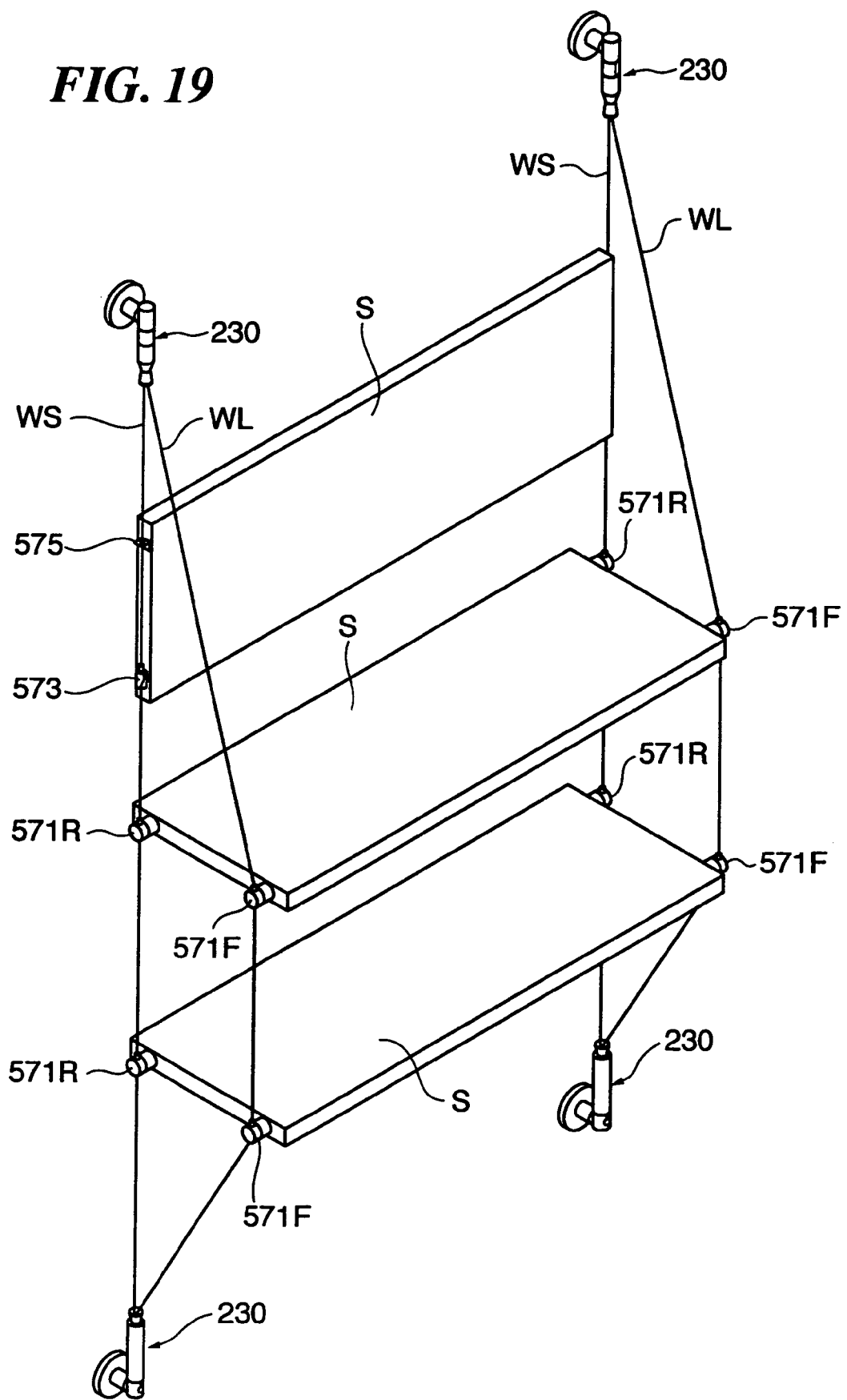
FIG. 19 shows a shelf suspending system according to the embodiment of the present invention.

FIG. 19 shows a shelf suspending system according to the embodiment of the present invention.

This example shows a system for suspending two shelves horizontally on a wall surface using the wire gripper assembly 230. Two pairs of the wire gripper assemblies 230, in which one pair of the wire gripper assemblies is composed of two wire gripper assemblies longitudinally separately arranged, are laterally separately mounted on a wall surface. The wire gripper assembly 230 comprises the wire gripper and the fixed part 231, as shown in FIG. 14B. The fixed part 231 is fixedly mounted on the wall surface. Since the wire gripper 200 is rotated relative to the fixed part 231, the upper wire gripper 200 faces downward and the lower wire gripper 200 faces upward. Between the wire gripper assemblies 230, the shelves S are held horizontally by wires.

A wire gripper 571, having a shelf catch as shown in FIG. 8, is mounted around each end of each opposite side (the shorter side in this example) of the shelf S. In this example, the shelf S is held to the shelf catch by not inserting the shelf into the groove but tightening a screw. And, the wire gripper 571 can grip not two wires but one wire.

The ends of the wires W are gripped to the upper and lower wire gripper assemblies 230, respectively. Each length of the two wires is different. And, the intermediate portion of the shorter wire WS is gripped to the wall-side wire gripper 571R, while the intermediate portion of the longer wire WL is gripped to the front-side wire gripper 571F.

In this example, the upper and lower ends of the wires are gripped to one wire gripper, respectively, resulting in treating the ends of the wires W with a good appearance.

In addition, in this example, it is also possible that a shelf is suspended vertically on the wall surface. In such a case, at each opposed side of the shelf, a wire gripper 573 and a wire guide 575 are attached.

Figure 20:
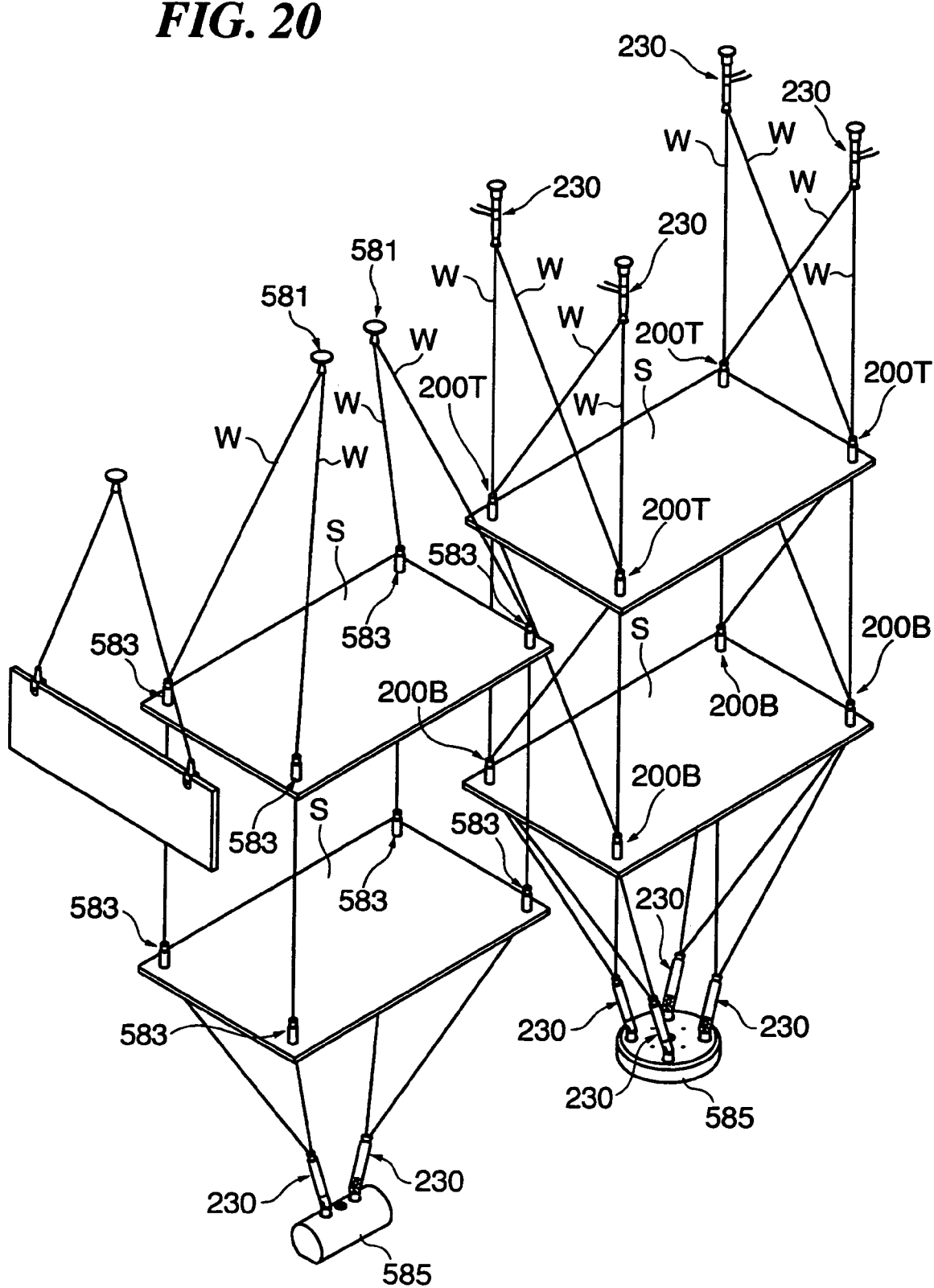
FIG. 20 shows a shelf suspending system according to the embodiment of the present invention.

FIG. 20 shows a shelf suspending system according to the embodiment of the present invention.

This example shows a system for suspending a shelf S from a ceiling horizontally.

First, a shelf suspending system, shown in the center part of the figure, will be explained. In this case, two shelves S are suspended with being longitudinally separated.

On the ceiling, an attachment 581, to which ends of two wires are fixedly connected, is mounted. And, a wire gripper 583 capable of gripping one wire is fixedly mounted through each corner of the shelves S. Two wires W of the attachment 581 extend downward in forward and backward directions in the figure and the intermediate portion of each wire W is gripped to the wire gripper 583, which is mounted at the shorter side of the shelf S. And, the lower ends of the wires W are gripped to the wire gripper assembly 230 (as shown in FIG. 14B) mounted to a weight 585 placed on a floor. In addition, it is also possible that the lower wire gripper 230 is directly fixed to the floor.

Using the wire gripper assembly 230 having the wire gripper capable of gripping two wires makes it possible that the weight 585 is placed just under the center of the shelf S. For example, when a wire gripper capable of gripping one wire is used in a conventional way, it is necessary to place a weight just under the four corners of the shelf. So, the number of components necessary for the suspension system increases. And, a problem in which someone might stub his toe against the wire or the weight is raised. On the contrary, since using the wire gripper capable of gripping two wires makes it possible that the weight 585 is placed just under the center of the shelf, such problem is erased.

Next, a shelf suspending system, shown in the right part in the figure, will be explained. In this example, two shelves S are suspended with being longitudinally separated.

On the ceiling, a wire gripper assembly 230 (as shown in FIG. 14B) is fixedly mounted. And, a wire gripper 200, shown in FIG. 12, is fixedly mounted through each corner of the shelves S.

From the wire gripper assembly 230, two wires extend downward in backward and forward directions. Each of the intermediate portions of the wires W is gripped to the wire gripper 200T, which is mounted at the shorter side of the upper shelf S. Then, the two wires extend downward in backward and forward directions. And, each of the intermediate portions of the wires W is gripped to the wire gripper 200B, which is mounted at the shorter side of the lower shelf S. The lower ends of the two wires W are gripped to the wire gripper assembly 230 (as shown in FIG. 14B) mounted on a weight 585 placed on the floor.

This example can decrease swinging of the shelves S in forward and backward directions compared with the example shown at the center part of the figure. Because, as described in the example of FIG. 6, swinging of the shelf in forward and backward directions can be prevented by the diagonal wires. And, by using the wire gripper capable of gripping two wires, the ends of the wires and the mounting portion of the wire to the shelf can be treated with a good appearance.

Figure 21:
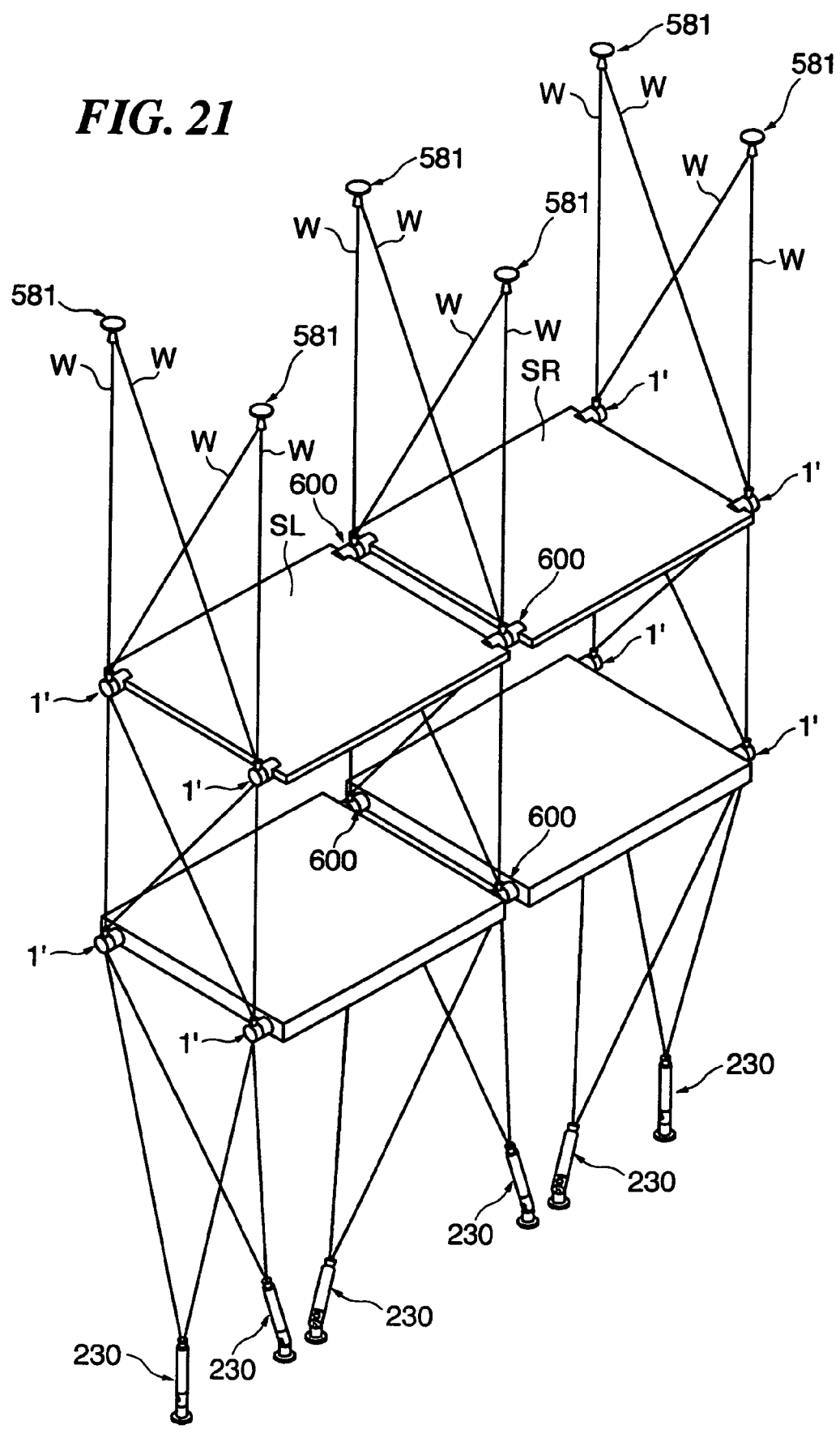
FIG. 21 shows a shelf suspending system according to another embodiment of the present invention.

FIG. 21 shows a shelf suspending system according to another embodiment of the present invention.

This example also shows a system for suspending shelves horizontally from a ceiling. In this example, two shelves S can be suspended side by side in horizontal direction.

On a ceiling, an attachment 581, to which upper ends of two wires are fixedly connected, are mounted. A wire gripper 1', having a shelf catch shown in FIG. 8, is fixedly mounted around each end of each opposite side (the shorter side in this example) of the shelf S. And, two shelves S are connected horizontally by using a wire gripper 600 having two shelf catches facing in opposite directions. In each shelf catch, the shelves SL and SR are held respectively. The shelf catch may be the groove type or the screw type.

The two wires of the attachment 581 mounted on the ceiling extend downward in backward and forward directions. And, the intermediate portions of the wires W are gripped to the wire gripper 1' or the wire gripper 600, which are mounted at the shorter side of the upper shelf S. Then, the two wires extend downward in backward and forward directions. And, the intermediate portions of the wires W are gripped to the wire gripper 1' or the wire gripper 600, which are mounted at the shorter side of the lower shelf S. And, the lower ends of the two wires W are gripped to the wire gripper assembly 230 (as shown in FIG. 14B), which are arranged in a direction, in which the shelves SR and SL are coupled, and fixed on the floor. In addition, each of the two wires extends from the lower shelf S in rightward and leftward directions in the figure and is gripped to the adjacent wire gripper assemblies 230 arranged in the aforesaid direction (the rightward and leftward directions in figure).

In this example, the shelves S can be suspended without swinging in forward and backward directions in the figure. At the same time, since the wire gripper assemblies 230, mounted on the floor, are arranged in a direction in which the shelves SR and SL are coupled, it also becomes possible that the shelves S are suspended without swinging in rightward and leftward directions.

Figure 22:
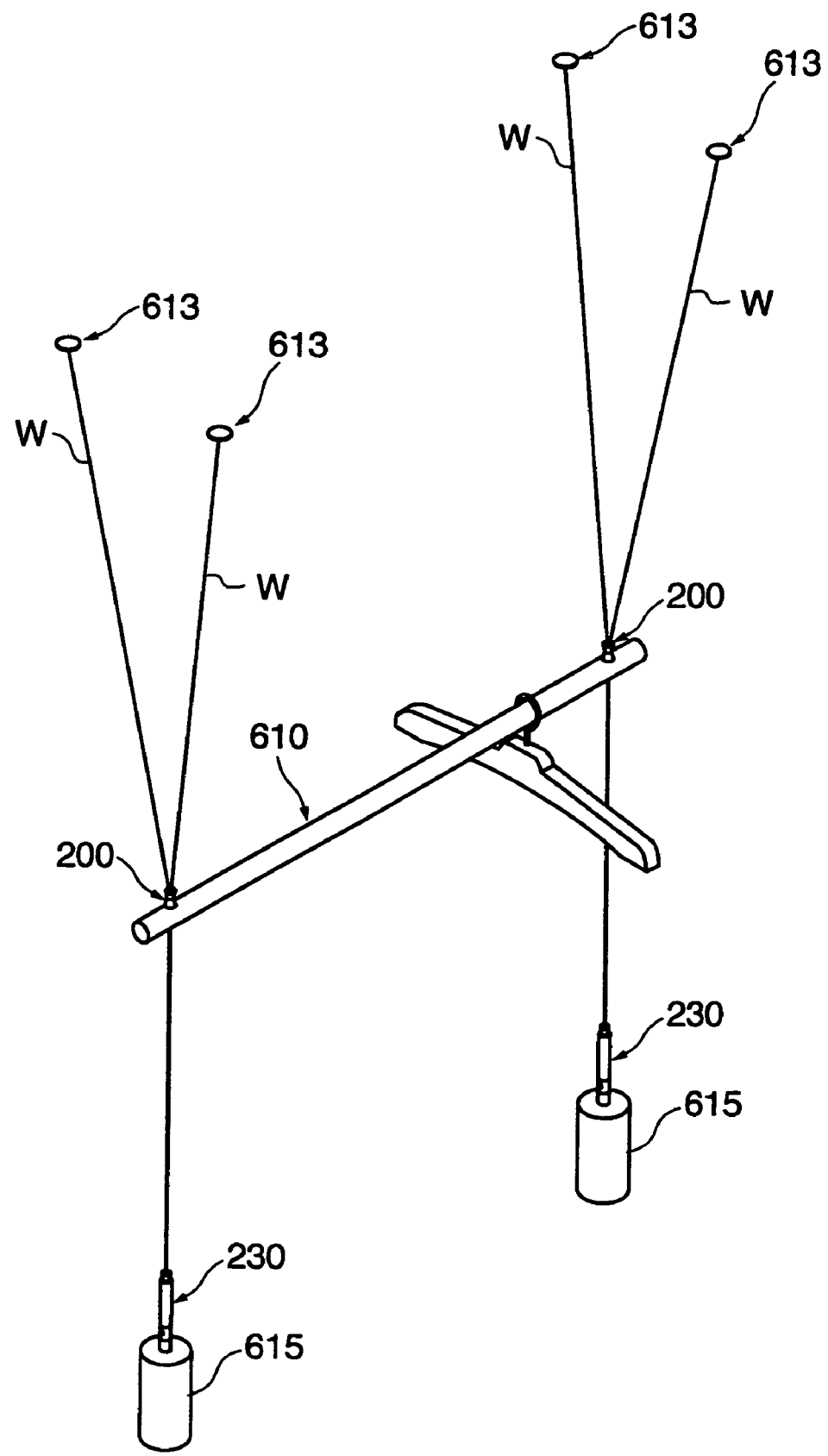
FIG. 22 shows a bar suspending system according to the present invention.

FIG. 22 shows a bar suspending system according to the present invention.

This example shows a system for suspending a bar 610, to which hangers and the like are hung, from a ceiling. In this example, each end of the bar 610 is suspended using two wires hung from the ceiling.

On the ceiling, an attachment 613, to which upper end of a wire W is fixedly connected, are separately mounted arranged in a direction perpendicular to a length direction of the bar 610. And, the wire gripper 200 capable of gripping two wires, as shown in FIG. 12, is fixedly mounted through at each end portion of the bar 610. The wires W, extending downward from the attachment 613, are gripped to the wire gripper 200 at the intermediate portions thereof and then extend downward in parallel. And, the lower ends of the wires W are gripped to the wire gripper assembly 230 (as shown in FIG. 14B) mounted to a weight 615 placed on a floor.

Figure 23A:
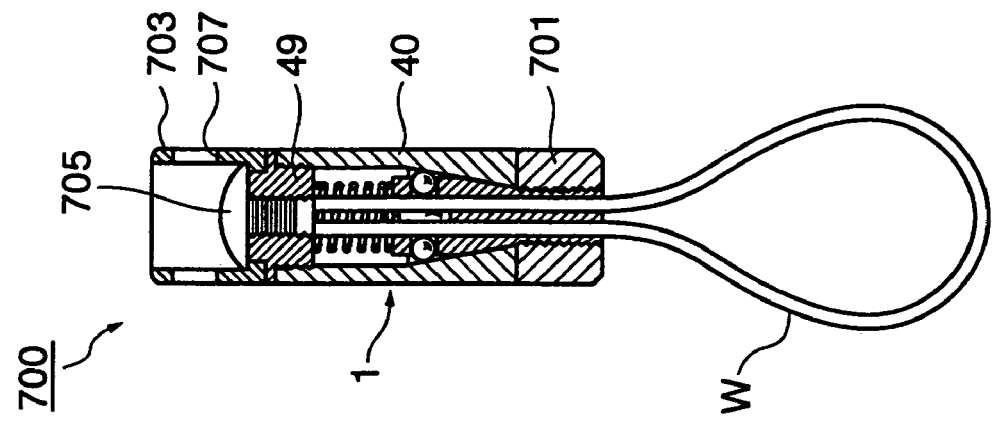
FIG. 23A is a front view thereof.
Figure 23B:
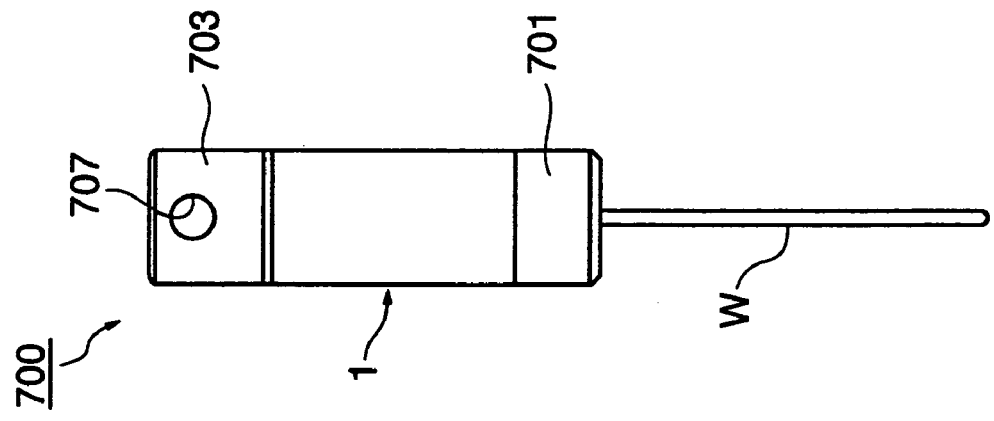
FIG. 23B is a side view thereof.
Figure 23C:
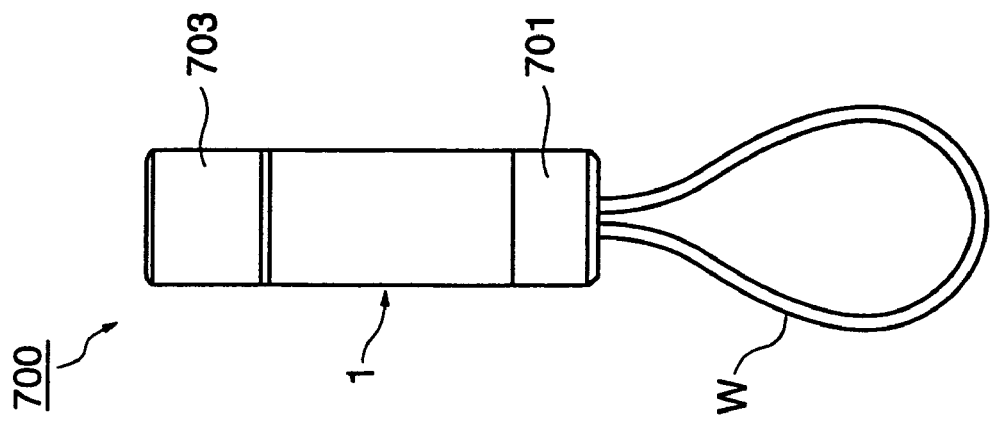
FIG. 23C is a front cross sectional views thereof.

FIG. 23 and FIG. 24 show a key ring type wire gripper according to the present invention: FIG. 23A and FIG. 24A are front views thereof; FIG. 23B and FIG. 24B are side views thereof; and FIG. 23C and FIG. 24D are front cross sectional views thereof.

This example shows a key ring using the wire gripper 1, shown in FIG. 1, providing with a wire guide cap, having substantially the same structure as that of FIG. 12. The wire gripper grips both ends of a wire W which is bent into a loop.

In the key ring 700 shown in FIG. 23, the gripper 1 is column-shaped. And, the cap 701 is also column-shaped without the tapered inner surface. In addition, a rotating case 703 is rotatably mounted to the spring retainer 49, which is engaged with the lower hollow portion of the outer sleeve 40, by a truss screw 705. The rotating case 703 is formed with a penetrating bore 707 in a direction perpendicular to an axis direction of the wire-insertion bore of the gripper.

The key ring 800, shown in FIG. 24, including a cap 801 and a spring retainer 803, is oval-shaped.

When a key is held to the wire W, the cap 701 or 801 is rotated with the wire gripper 1 so that a clearance is produced between the cap 701 or 801 and the outer sleeve, resulting in releasing a wire from the gripper.

What is claimed is:

1. A wire gripper comprising:
   (i) an inner sleeve, comprising:
      two wire-insertion bores adapted to have wires inserted therein, respectively;
      a pair of large-diameter ball-set bores provided across from each other, each large-diameter bore being open to both of said wire-insertion bores and to an outer surface of said inner sleeve; and
      a pair of small-diameter ball-set bores provided across from each other, each small-diameter bore being open to one of said wire-insertion bores and to the outer surface of said inner sleeve, the two small-diameter bores being opened to different wire-insertion bores;
      wherein the outer surface of said inner sleeve is tapered at a portion of said inner sleeve where said ball-set bores are formed;
   (ii) four balls received in said ball-set bores and protruding partially into said wire-insertion bores so as to grip said wires, wherein said four balls comprise two large-diameter balls provided across from each other in the large-diameter ball-set bores, respectively, and two small-diameter balls provided across from each other in the small-diameter ball-set bores, respectively, and wherein a first one of said wires is pressed by both of the large-diameter balls and a first one of the small-diameter balls to grip the wire, and a second one of said wires is pressed by both of the large-diameter balls and a second one of the small-diameter balls to grip the wire;

(iii) an outer sleeve having a tapered inner surface which contacts said tapered outer surface of said inner sleeve so as to press said balls inward; and (iv) a spring for biasing said inner sleeve relative to said outer sleeve in a direction along which the tapered outer surface is tapered down.

2. A wire gripper according to claim 1, wherein a ratio of a diameter of said large-diameter balls to a diameter of said small-diameter balls is about 3:2.

3. A wire gripper according to claim 1, wherein said inner sleeve has a tip portion protruded from said outer sleeve in a direction in which said inner surface of said outer sleeve is tapered down, and wherein said wire gripper further comprises a wire guide cap mounted to said protruded tip portion of said inner sleeve, said wire guide cap having a wire-insertion bore formed with a tapered inner surface which is widened towards a tip end thereof.

4. A wire gripper according to claim 3, wherein said wire guide cap serves as a mechanism for locking said wires to said wire gripper.

5. A wire gripper according to claim 1, wherein said outer sleeve is provided with a shelf catch portion having a groove to which a shelf is inserted.

6. A wire gripper according to claim 1, further comprising a hook provided on said outer sleeve.

* * * * *